United States Patent
Styles et al.

(10) Patent No.: US 10,239,518 B2
(45) Date of Patent: Mar. 26, 2019

(54) METHODS AND SYSTEMS FOR ADJUSTING ENGINE OPERATION BASED ON WEATHER DATA

(71) Applicant: Ford Global Technologies, LLC, Dearborn, MI (US)

(72) Inventors: Daniel Joseph Styles, Canton, MI (US); Eric Matthew Kurtz, Dearborn, MI (US); Paul Joseph Tennison, West Bloomfield, MI (US); Michiel J. Van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/896,568

(22) Filed: Feb. 14, 2018

(65) Prior Publication Data
US 2018/0170363 A1  Jun. 21, 2018

Related U.S. Application Data

(63) Continuation of application No. 15/092,955, filed on Apr. 7, 2016, now Pat. No. 9,896,089.

(51) Int. Cl.
| | |
|---|---|
| *B60W 30/00* | (2006.01) |
| *F02D 41/26* | (2006.01) |
| *F02P 5/15* | (2006.01) |
| *G07C 5/08* | (2006.01) |
| *B60W 40/02* | (2006.01) |

(Continued)

(52) U.S. Cl.
CPC ............ *B60W 30/00* (2013.01); *B60W 40/02* (2013.01); *F01P 7/16* (2013.01); *F02D 29/02* (2013.01); *F02D 41/021* (2013.01); *F02D 41/263* (2013.01); *F02P 5/1502* (2013.01); *G07C 5/0825* (2013.01); *B60W 2550/12* (2013.01); *F01P 2005/046* (2013.01); *F01P 2025/32* (2013.01); *F02B 29/0493* (2013.01); *F02D 2200/0418* (2013.01);

(Continued)

(58) Field of Classification Search
CPC ...... F02D 29/02; F02D 41/021; F02D 41/263; F02D 2200/701; F02D 2200/702; F01P 7/16; F02P 5/1502; B60W 30/00; B60W 40/02; B60W 2550/12; G07C 5/0825
USPC ........................................................ 701/102
See application file for complete search history.

(56) References Cited

U.S. PATENT DOCUMENTS

| | | |
|---|---|---|
| 6,062,204 A | 5/2000 | Cullen |
| 6,390,055 B1 | 5/2002 | Sivashankar et al. |

(Continued)

*Primary Examiner* — John Kwon
*Assistant Examiner* — Johnny H Hoang
(74) *Attorney, Agent, or Firm* — Julia Voutyras; McCoy Russell LLP

(57) ABSTRACT

Methods and systems are provided for adjusting engine operation based on wirelessly received weather data in conjunction with engine sensor outputs. In one example, a method may comprise receiving a first measurement of a weather parameter from one or more engine sensors and a second measurement of the weather parameter from weather data, the weather data provided by a wireless weather service. The method may further comprise determining accuracies for the first and second measurements, generating an estimate of the weather parameter based on the accuracies of the first and second measurements, and adjusting at least one engine operating parameter based on the generated estimate.

20 Claims, 9 Drawing Sheets

(51) Int. Cl.
   *F02D 41/02*   (2006.01)
   *F01P 7/16*    (2006.01)
   *F02D 29/02*   (2006.01)
   *F02B 29/04*   (2006.01)
   *F01P 5/04*    (2006.01)
   *F02M 26/06*   (2016.01)

(52) U.S. Cl.
   CPC .. *F02D 2200/701* (2013.01); *F02D 2200/702* (2013.01); *F02M 26/06* (2016.02)

(56) References Cited

U.S. PATENT DOCUMENTS

| | | |
|---|---|---|
| 6,725,848 B2 | 4/2004 | Ramamurthy et al. |
| 6,886,336 B2 | 5/2005 | Super et al. |
| 6,919,821 B1 | 7/2005 | Smith |
| 8,608,374 B2 | 12/2013 | Hamama et al. |
| 9,328,698 B2 | 5/2016 | MacNeille et al. |
| 2002/0013654 A1 | 1/2002 | Masters et al. |
| 2005/0192724 A1 | 9/2005 | Hendry |
| 2006/0064232 A1 | 3/2006 | Ampunan et al. |
| 2010/0073158 A1 | 3/2010 | Uesaka et al. |
| 2012/0158207 A1 | 6/2012 | MacNeille et al. |
| 2013/0338901 A1 | 12/2013 | Kumar et al. |
| 2014/0110488 A1 | 4/2014 | Sumilla et al. |
| 2015/0019107 A1 | 1/2015 | Whitehead et al. |
| 2015/0240730 A1 | 8/2015 | Styles et al. |
| 2015/0337745 A1* | 11/2015 | MacNeille .............. F02D 37/02 123/406.48 |

* cited by examiner

METHODS AND SYSTEMS FOR ADJUSTING ENGINE OPERATION BASED ON WEATHER DATA

CROSS REFERENCE TO RELATED APPLICATION

The present application is a continuation of U.S. patent application Ser. No. 15/092,955, entitled "METHODS AND SYSTEMS FOR ADJUSTING ENGINE OPERATION BASED ON WEATHER DATA," filed on Apr. 7, 2016. The entire contents of the above-referenced application are hereby incorporated by reference in its entirety for all purposes.

BACKGROUND/SUMMARY

Engine systems are typically feedback controlled based on outputs from various engine sensors configured to measure current engine operating conditions. That is, engine operations such as spark timing, fuel injection timing, throttle position, exhaust gas recirculation (EGR), etc., may be adjusted by an engine controller based on sensor outputs. The engine controller can utilize the information from these sensors, along with various algorithms and look-up tables, to maintain peak vehicle performance during changing conditions. For example, the engine controller may adjust spark characteristics to compensate for changes in humidity.

Modern vehicle systems may be equipped with cloud-based communications systems for providing vehicle location information, route guidance, and weather reports. Some approaches aimed at reducing reliance on vehicle sensors may utilize weather data received through the vehicle's wireless communications system to estimate ambient conditions and adjust vehicle operation. One example of such an engine control system is shown by Ampunan et al. in US 2006/0064232. The engine controller may adjust an engine operating parameter based on a measurement of an ambient condition obtained from the received weather data and not from a vehicle sensor configured to measure the ambient condition. Thus, fewer sensors may be equipped in the vehicle system, reducing the cost of the vehicle system.

However, the inventors herein have recognized potential issues with such systems. As one example, the weather data may be less accurate than outputs from the vehicle sensors. Weather data may be obtained from various weather stations equipped with instruments for measuring atmospheric conditions. However, as the distance between a vehicle and the nearest weather station increases, the difference in weather conditions between the vehicle's current location and the nearest weather station may increase, and thus, the accuracy of the weather data may decrease. Further, a vehicle may travel through terrain such as mountains, tunnels, etc., where wireless communication is interrupted and/or lost. During such periods where the weather information is not updated, the accuracy of the estimated engine operating conditions may be reduced, and as such engine performance may be degraded. In yet further examples, a vehicle may enter a microclimate such as a covered area, puddle, car wash, etc., where the ambient conditions at the specific vehicle location may be different than the average ambient conditions for the regional location in which the vehicle is positioned. In such examples, the accuracy of received weather data may be reduced.

In one example, the issues described above may be addressed by a method comprising receiving a first measurement of a weather parameter from one or more engine sensors and a second measurement of the weather parameter from weather data, determining a first accuracy of the first measurement and a second accuracy of the second measurement, generating an estimate of the weather parameter based on the accuracies of the first and second measurements, and adjusting at least one engine operating parameter based on the generated estimate.

In another representation, a method may comprise in a first mode where wireless communication with a weather service provider is not established, adjusting at least one engine operating parameter based on outputs from one or more vehicle sensors, in a second mode where wireless communication with a weather service provider is established and an accuracy of the one or more vehicle sensors is less than a threshold, adjusting the at least one engine operating parameter based on wirelessly received weather data, and in a third mode where wireless communication with a weather service provider is established and the accuracy of the one or more vehicle sensor is not less than the threshold, adjusting the at least one engine operating parameter based on the wirelessly received weather data and outputs from the one or more vehicle sensors.

In another representation, a vehicle system may comprise an engine system including one or more sensors, where the one or more sensors provide a first set of measurements for a plurality of weather parameters, a wireless communication module configured to receive weather data from a network of remote servers, the weather data including a second set of measurements of the plurality of weather parameters, and a controller in communication with the wireless communication module, the controller including computer readable instructions for: determining a first set of accuracies for the first set of measurements obtained from the one or more sensors, determining a second set of accuracies for the second set of measurements obtained from the weather data, and adjusting at least one engine operating parameter based on the first and second sets of accuracies.

In this way, more accurate estimates of current ambient conditions may be achieved by evaluating both the accuracies of one or more engine sensors configured to measure the ambient conditions and the accuracy of wirelessly received weather data including measurements of the current ambient conditions. Specifically, depending on the accuracies of the engine sensors and the weather data, one or more of the ambient conditions may be estimated based on one or more of the sensors, or the weather data, or both. Engine operating parameters may be controlled more precisely to desired levels given the more accurate estimates of the current ambient conditions. As a result fuel efficiency may be increased, and emissions may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
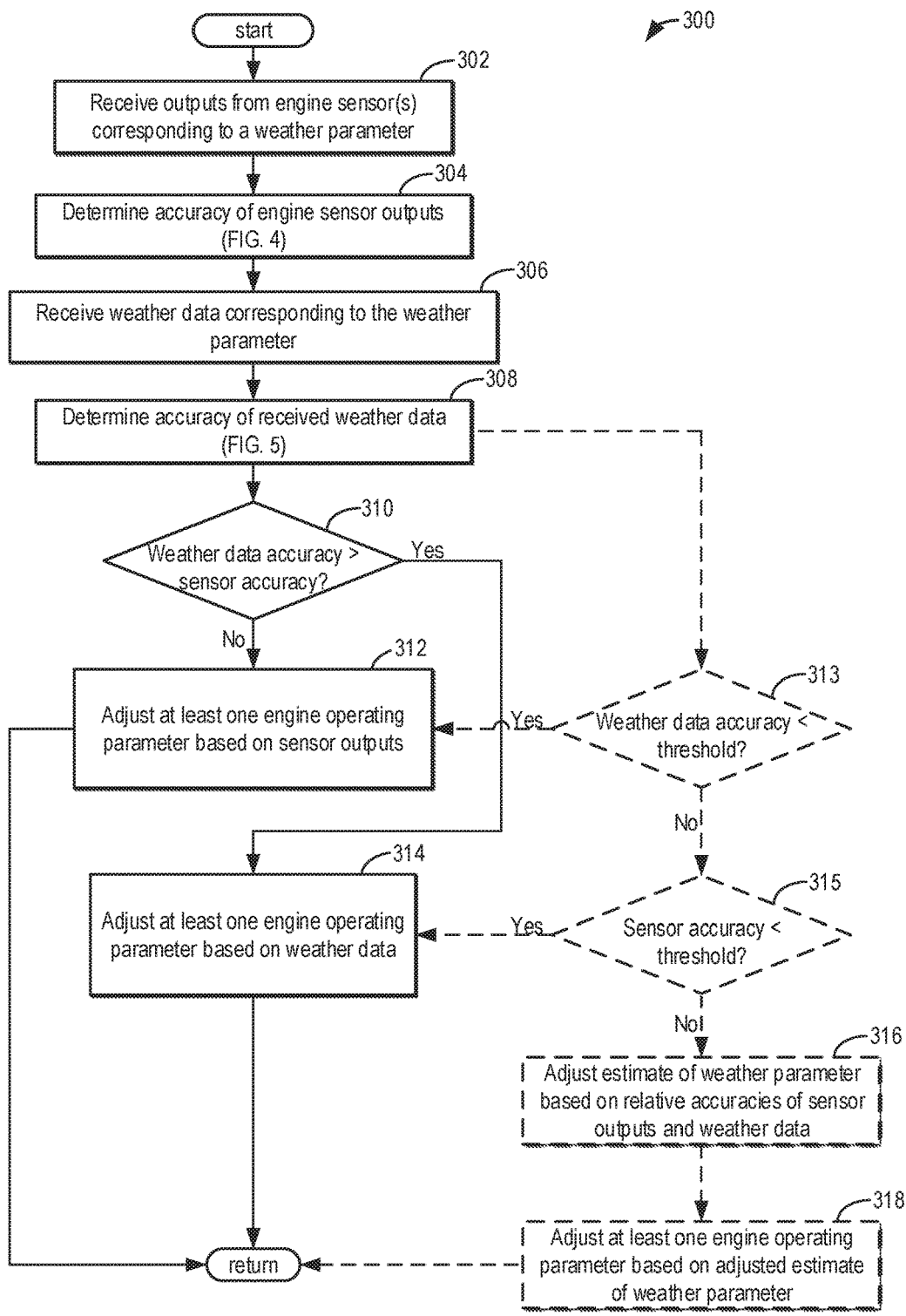
FIG. 3 shows a flow chart of a method for adjusting engine operating parameters based on vehicle sensor output and/or received weather data, in accordance with one or more embodiments of the present disclosure.
Figure 4:
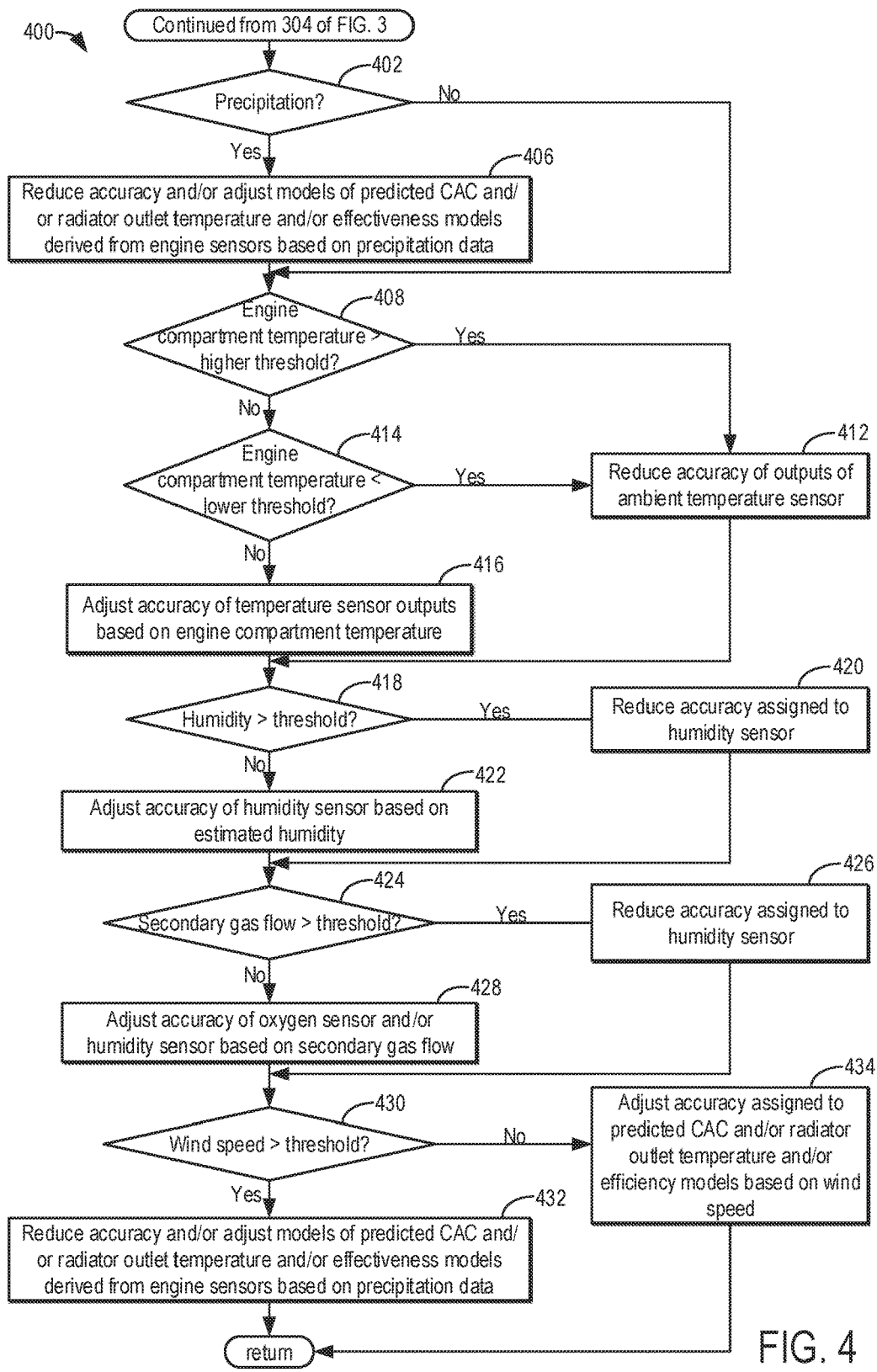
FIG. 4 shows a flow chart of a method for assessing the accuracy of vehicle sensor outputs and models of engine operating conditions based on the sensor outputs, in accordance with one or more embodiments of the present disclosure.
Figure 5:
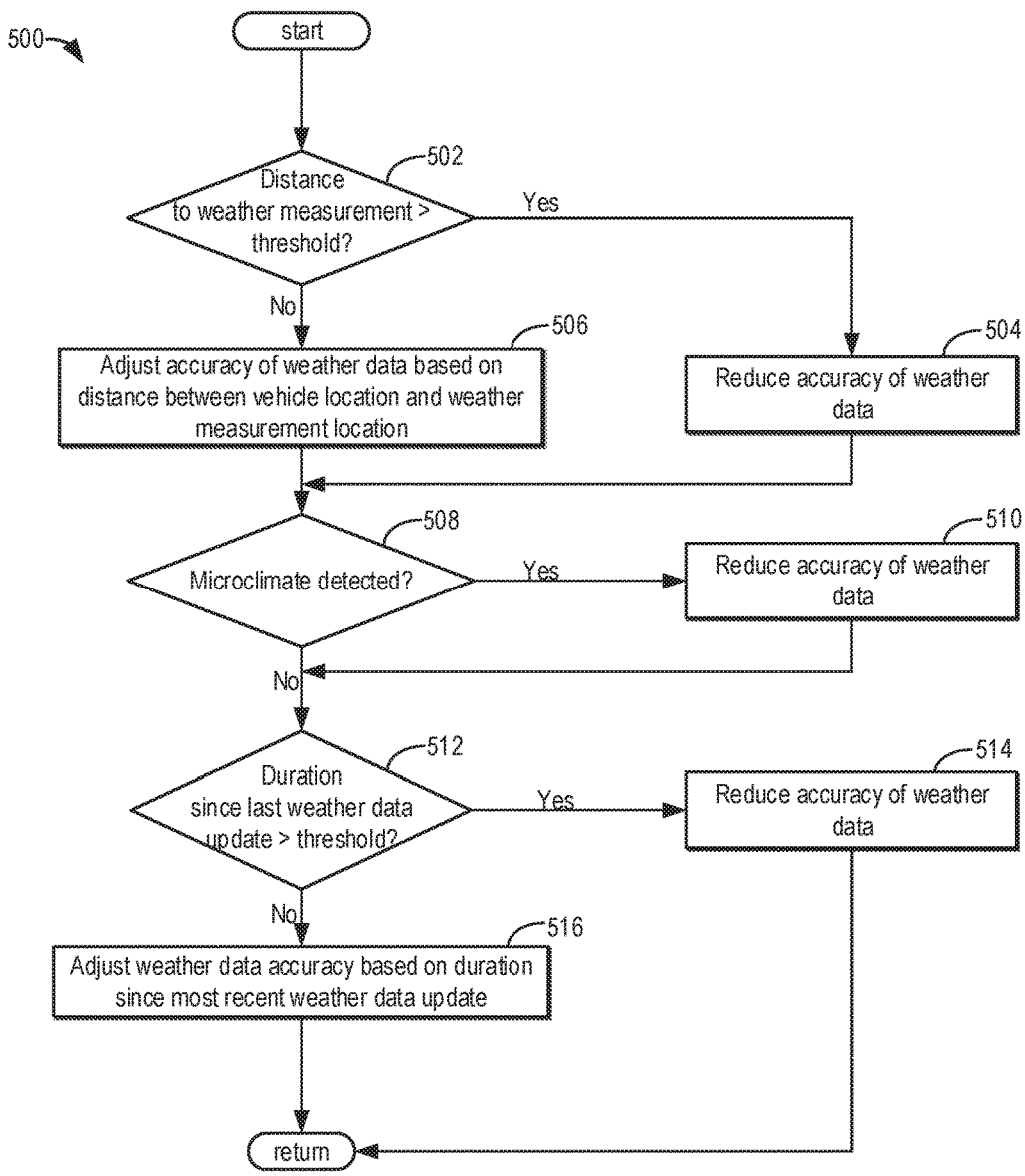
FIG. 5 shows a flow chart of a method for assessing the accuracy of received weather data, in accordance with one or more embodiments of the present disclosure.

The following description relates to systems and methods for adjusting engine operating parameters based on weather data and/or vehicle sensors' outputs. As shown in the example vehicle system of FIG. 2, a vehicle including an engine system may comprise various sensors for measuring ambient conditions and current engine operating conditions. Further, the vehicle may include a wireless communications system, enabling the vehicle to receive data corresponding to traffic, weather, location, etc., as shown in the example communications network of FIG. 1. FIG. 3 shows an example method for determining how to use weather data and vehicle sensor outputs to increase the accuracy of estimates of current ambient conditions to improve engine performance. Specifically, FIG. 5 shows an example method for determining the accuracy of received weather data and FIG. 4 shows an example method for determining the accuracy of vehicle sensors' outputs. An engine controller may then adjust estimates of ambient conditions based on the accuracies of the weather data and sensor outputs.

Figure 6:
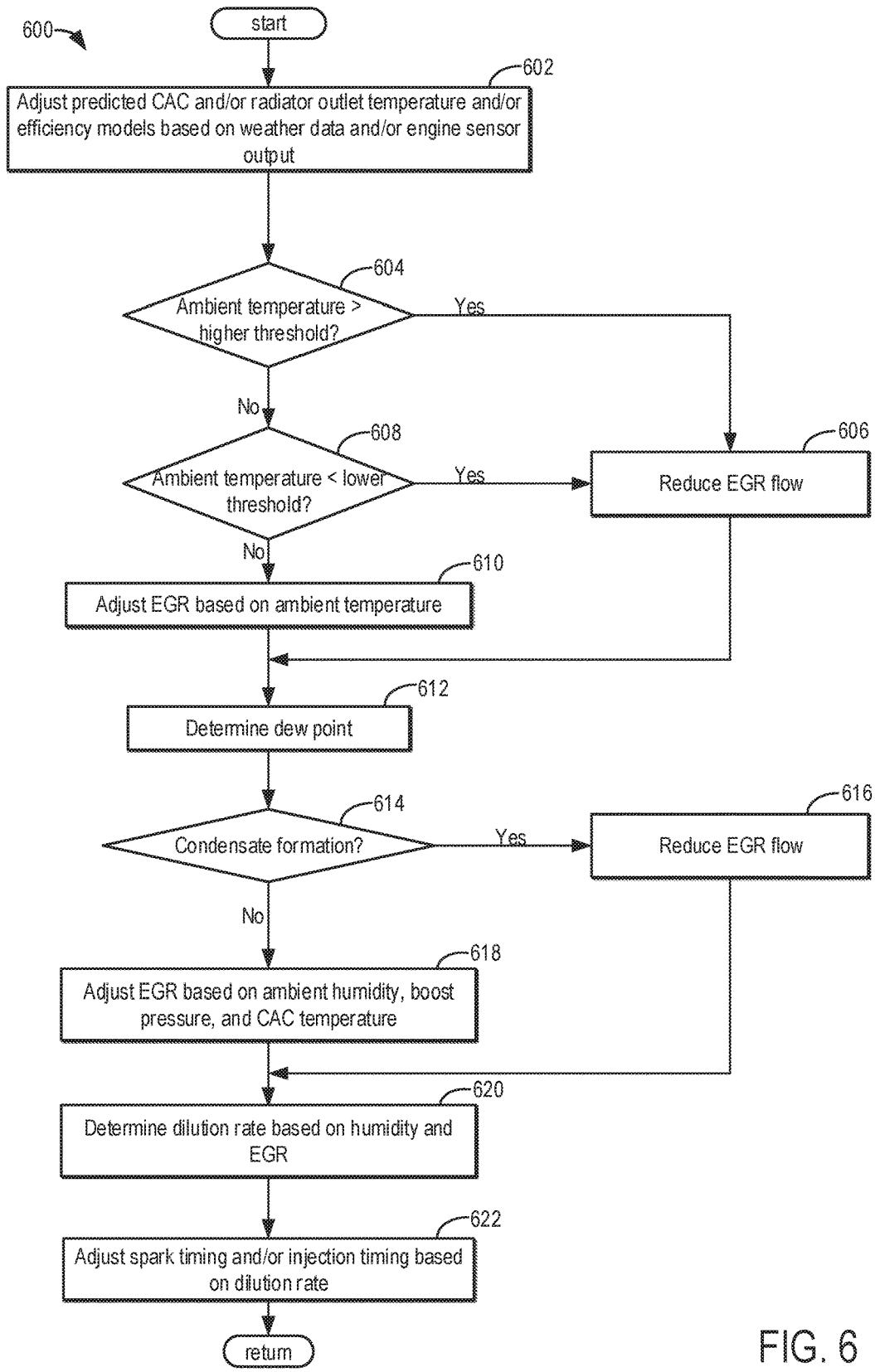
FIG. 6 shows a flow chart of a method for adjusting exhaust gas recirculation (EGR) flow and spark timing based on vehicle sensor output and/or received weather data, in accordance with one or more embodiments of the present disclosure.
Figure 7:
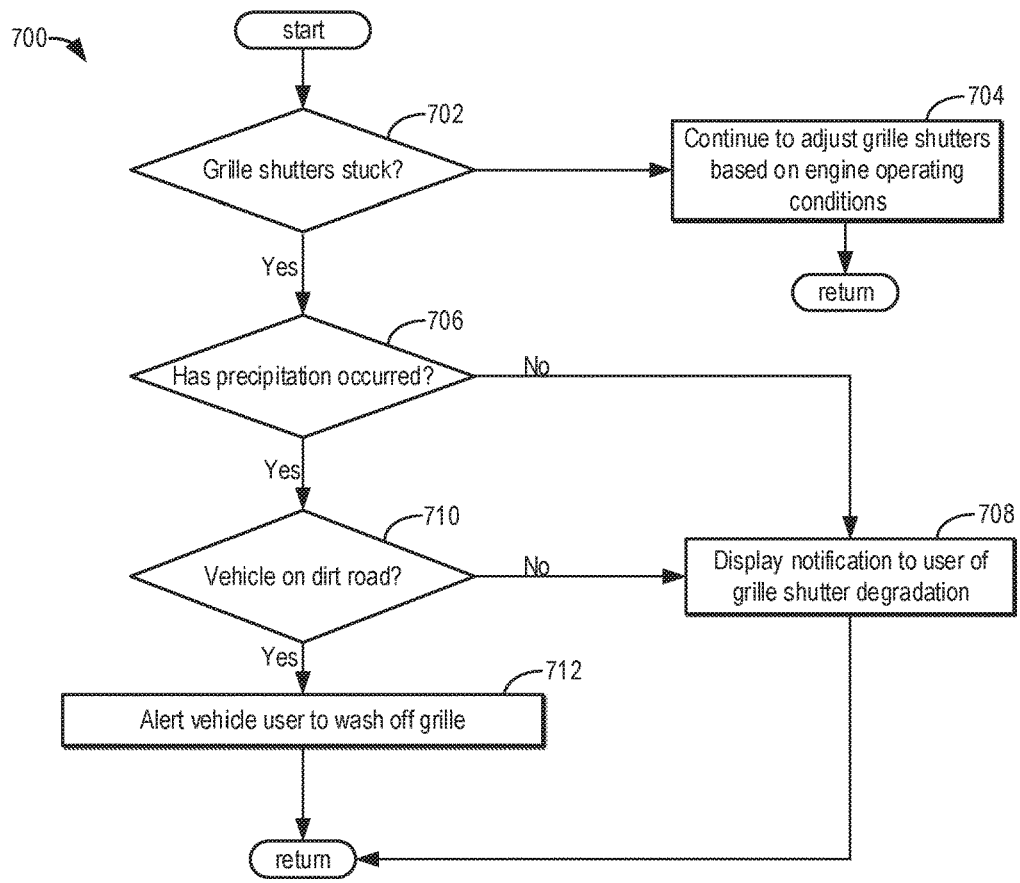
FIG. 7 shows a flow chart of a method for diagnosing grille shutter faults based on vehicle sensor output and/or received weather data, in accordance with one or more embodiments of the present disclosure.
Figure 8:
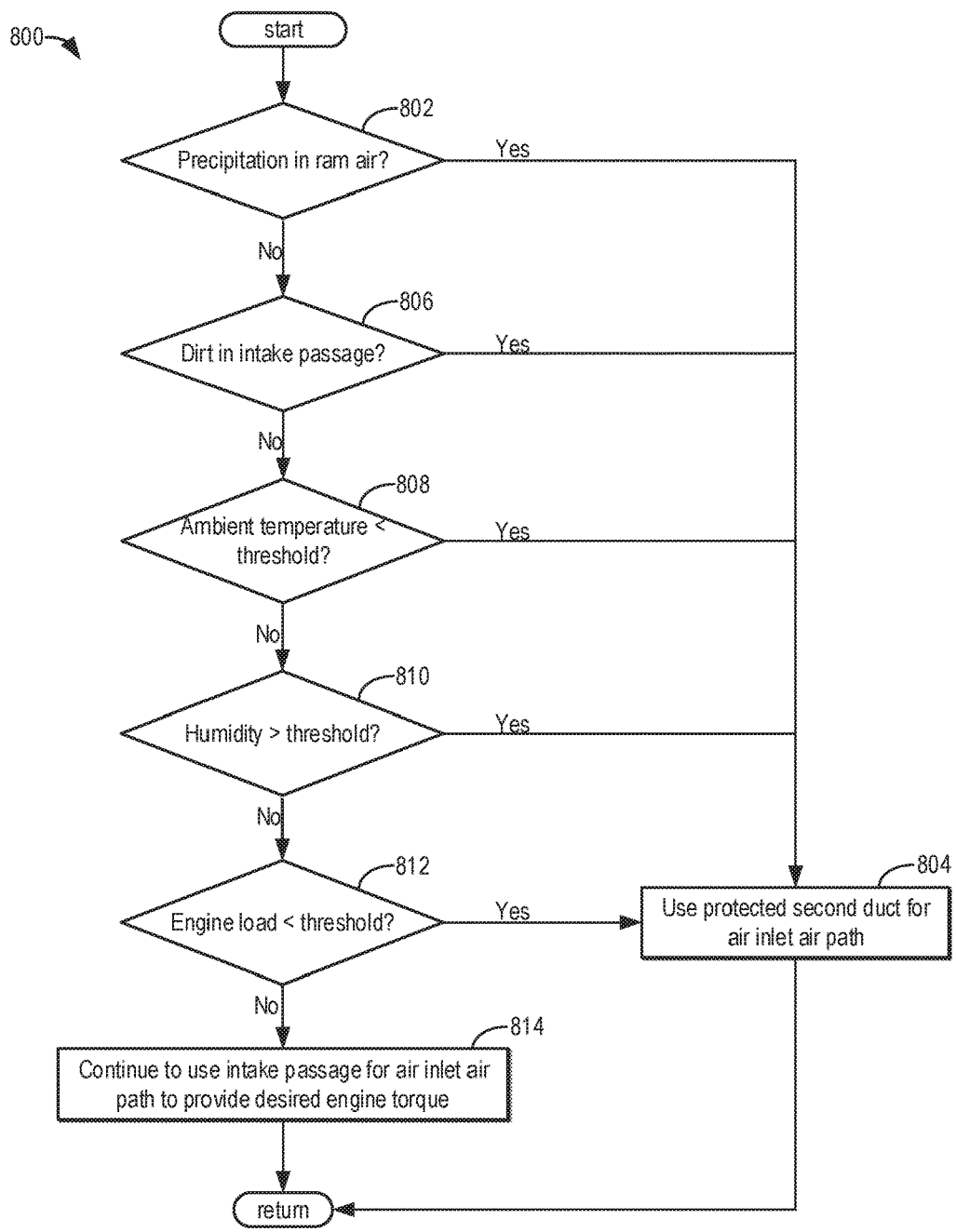
FIG. 8 shows a flow chart of a method for operating a two mode air cleaner based on vehicle sensor output and/or received weather data, in accordance with one or more embodiments of the present disclosure.
Figure 9:
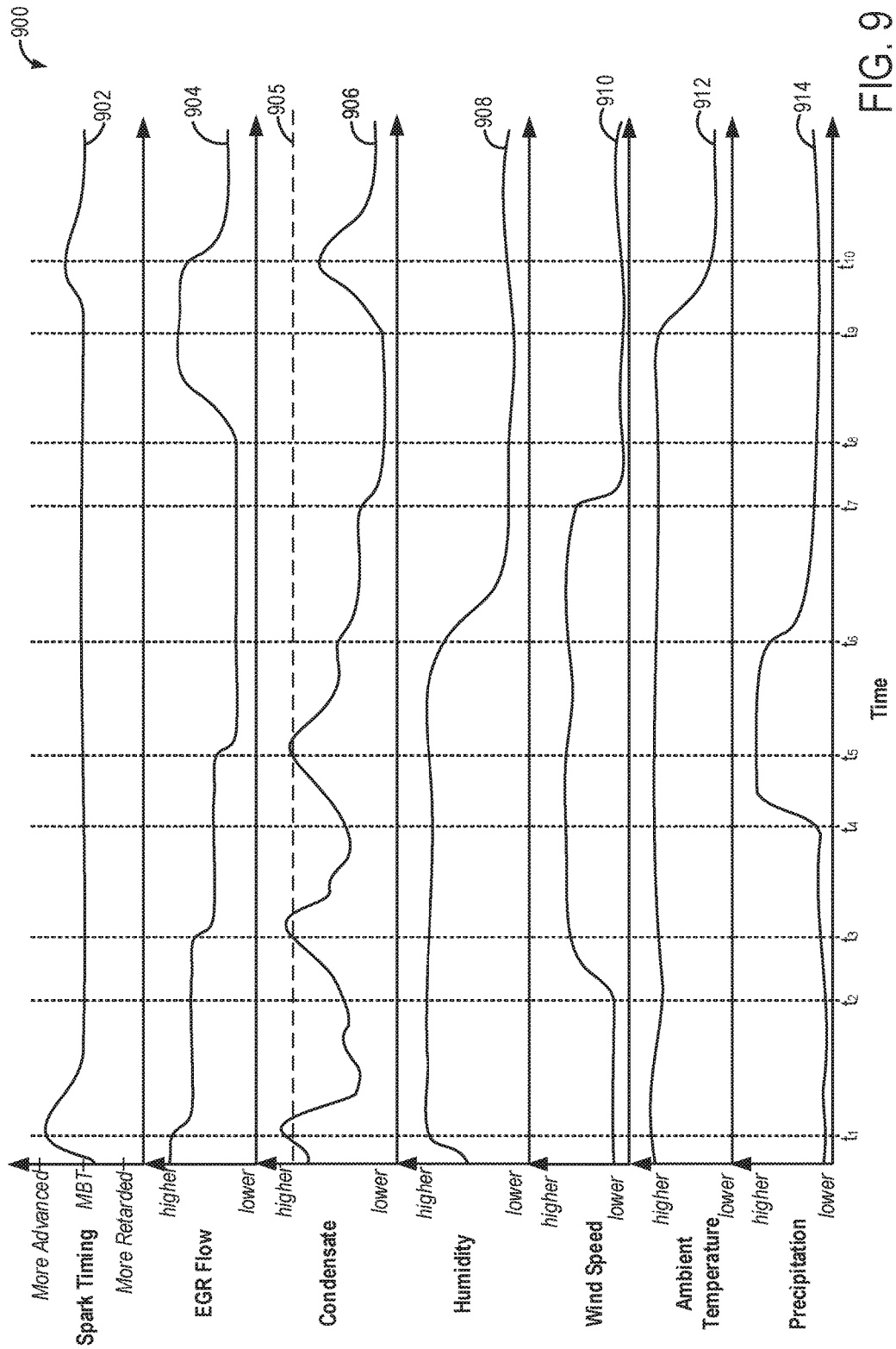
FIG. 9 shows a graph illustrating example adjustments to EGR under varying engine operating conditions as determined based on received weather data and/or vehicle sensors' outputs, in accordance with one or more embodiments of the present disclosure.

Engine operating parameters may thus be more precisely controlled based on the adjusted estimates of ambient conditions. For example, EGR flow, injection timing, and/or spark timing may be adjusted based on the estimated ambient conditions as shown in the example method of FIG. 6. Other example engine control operations that may be performed based on the adjusted estimates of ambient conditions are shown in FIGS. 7 and 8. Specifically, FIG. 7 shows an example method for diagnosing grille shutter faults, and FIG. 8 shows an example method for operating a two mode air cleaner. Example adjustments to EGR flow and spark timing under varying engine operating conditions are shown in FIG. 9.

Figure 1:
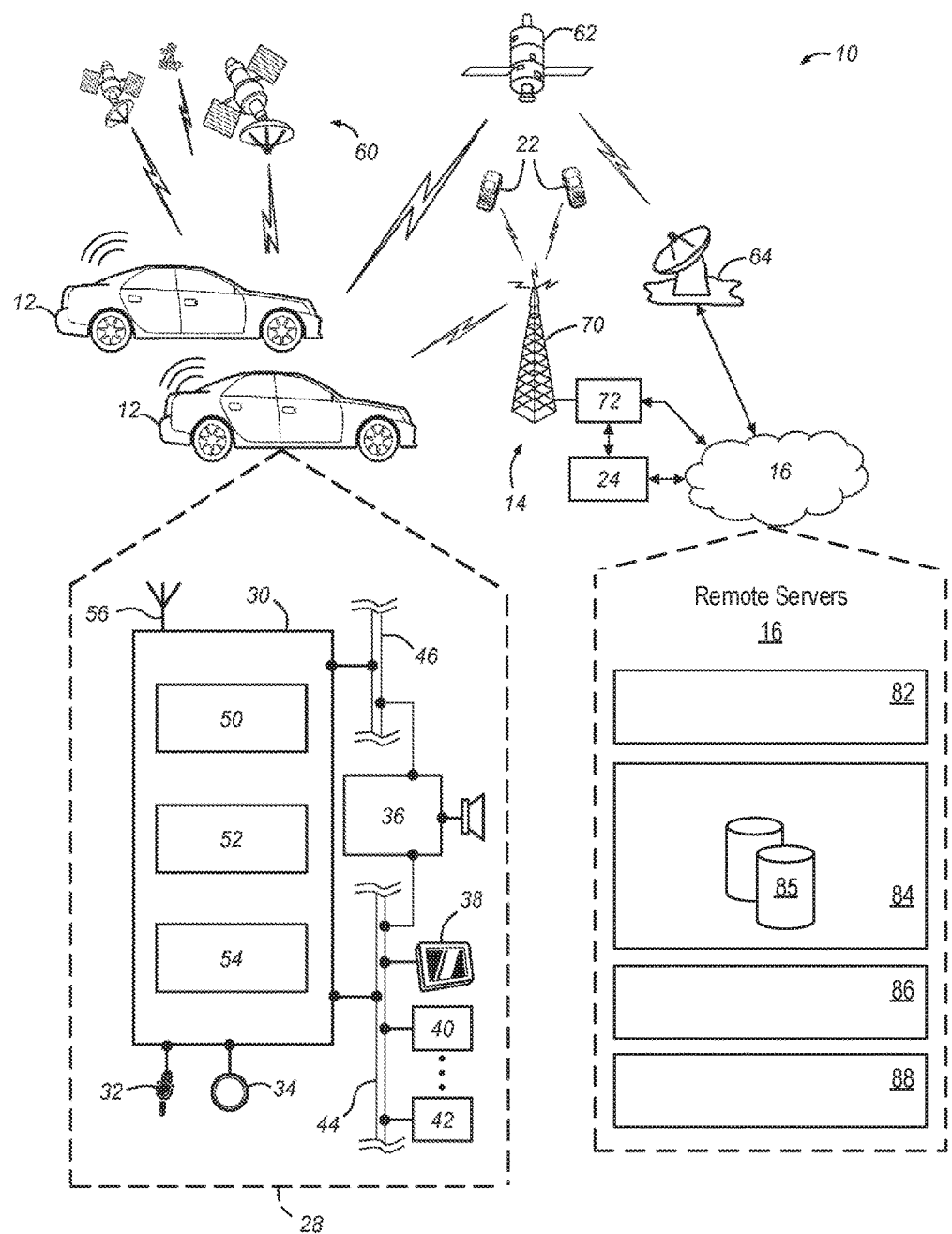
FIG. 1 shows a schematic diagram of an example wireless vehicle communications system in accordance with one or more embodiments of the present disclosure.

Beginning with FIG. 1, it shows a schematic diagram of an example wireless vehicle communications system 10. Wireless vehicle communications system 10 generally includes one or more telematics-equipped vehicles 12, one or more wireless systems 14 (also referred to herein as wireless networks 14), and one or more remote servers 16. The wireless vehicle communications system 10 may also be referred to herein as vehicle cloud computing system 10. The vehicle could computing system 10 enables wireless data transfer between each of the vehicles 12, and between the vehicles 12 and one or more remote servers 16. As one example, the vehicles 12 may continually or periodically receive data from the servers 16 relating to one or more of weather conditions, traffic information, vehicle location information, vehicle performance information, engine and/or vehicle diagnostics, etc. Further, the vehicles 12 may continually and/or periodically transmit data to the server 16 to be processed and/or stored by the servers 16 such as vehicle location information, engine and/or vehicle operating conditions, etc. As explained in greater detail below, engine and/or vehicle operation may be adjusted based on information received from servers 16 via the cloud computing system 10. An example vehicle and engine system are shown in greater detail below with reference to FIG. 2.

In some examples, the wireless vehicle communications system 10 may additionally include various personal wireless devices 22, and a short message service center (SMSC) 24. It should be understood that the methods disclosed below with reference to FIGS. 3-8 can be used with any number of different systems and is not specifically limited to the operating environment shown in FIG. 1. Thus, the following paragraphs simply provide a brief overview of one possible configuration for providing wireless communication between each of the vehicles 12, and/or between the vehicles 12 and remote servers 16. However, it should be appreciated that other systems not shown here may be employed to wirelessly transmit data between vehicles 12 and a network of remote servers in a cloud computing configuration.

Vehicles 12 are depicted in the illustrated embodiment as passenger cars, but it should be appreciated that any other vehicle including motorcycles, trucks, sports utility vehicles (SUVs), recreational vehicles (RVs), marine vessels, aircraft, etc., can also be used. Some of the vehicle electronics 28 are shown generally in FIG. 1. A more detailed description of an example vehicle engine is shown below with reference to FIG. 2. The vehicle electronics 28 may include one or more of a telematics unit 30, a microphone 32, one or more pushbuttons or other control inputs 34, an audio system 36, a visual display 38, and a navigation module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 may enable vehicles 12 to receive and/or transmit wireless signals corresponding to voice, text, and/or other data. Thus, telematics unit 30 may send and/or receive wireless signals (e.g., electromagnetic waves) such as Wifi, Bluetooth, radio, cellular, etc. Telematics unit 30 may therefore be referred to as transceiver 30, since it may be capable of both sending and receiving wireless signals. Wireless signals produced by the telematics unit 30 of vehicles 12 may be sent to and received by one or more of the vehicles 12, remote servers 16, GPS satellites 60, communication satellites 62, relay towers 70, etc. Thus, each of the vehicles 12 may be in wireless communication with one another for sending and/or receiving information therebetween via the telematics unit 30. Further, each of the vehicles 12 may be in wireless communication with the remote servers 16 for sending and/or receiving information there-between.

Wireless communication between the remote servers 16 and the vehicles 12 may be maintained even at greater distances between the servers 16 and the vehicles 12 by including relay towers 70. Each of the towers 70 may include sending and receiving antennas for relaying wireless signals between the remote servers 16 and the vehicles 12.

Additionally or alternatively, communications system 10 may utilize satellite communications to provide uni-directional or bi-directional communication between one or more of the vehicles 12 and the remote servers 16. This may be done using one or more communication satellites 62 and an uplink transmitting station 64. Uni-directional communication can be, for example, satellite radio services, wherein programming content (news, music, weather, etc.) is received by transmitting station 64, packaged for upload, and then sent to the satellite 62, which broadcasts the programming to subscribers. Further, in some examples as shown below with reference to FIGS. 3-8 each of the vehicles 12 may wirelessly transmit information to the satellite 62, which broadcasts the information to the servers 16.

As such, each of the vehicles 12 may communicate with one or more of the remote servers 16, other telematics-equipped vehicles 12, or some other entity or device capable of transmitting and/or receiving wireless signals. Telematics unit 30 enables the vehicles 12 to offer a number of different services including those related to messaging, navigation, telephony, weather reporting, traffic reporting, diagnostics, infotainment, etc. Data can be sent over a data connection, such as via a packet switching connection.

According to one embodiment, telematics unit 30 utilizes a wireless modem 50 for data transmission, an electronic processing device 52, one or more digital memory devices 54, and a dual antenna 56. It should be appreciated that the modem 50 can either be implemented through software or it can be a separate hardware component located internal or external to telematics unit 30. The modem 50 can operate using any number of different standards or protocols such as EVDO, CDMA, GPRS, and EDGE. Wireless networking between the vehicles 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet switching data communication such as TCP/IP, the telematics unit 30 can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit 30 to provide a wide variety of services. For instance, processor 52 can execute programs or process data to carry out at least a part of the methods discussed herein.

Telematics unit 30 can be used to provide a diverse range of vehicle services that involve wireless communication to and from the vehicles 12. Such services can include: diagnostic reporting of vehicle components such as engine components, engine and/or vehicle data, data relating to ambient weather conditions, remote control of certain vehicle features through the use of VSMs 42; turn-by-turn directions and other navigation-related services provided in conjunction with the navigation module 40. Furthermore, it should be understood that at least some of the aforementioned modules could be implemented in the form of software instructions saved internal or external to telematics unit 30, they could be hardware components located internal or external to telematics unit 30, and/or they could be integrated and/or shared with each other or with other systems located throughout the vehicles 12, to cite but a few possibilities. In the event that the modules are implemented as VSMs 42 located external to telematics unit 30, they could utilize communications bus 44 to exchange data and commands with the telematics unit 30.

Navigation module 40 may be configured to support any suitable navigation system such as GPS, GALILEO, GLONASS, IRNSS, etc. In examples, where the navigation module 40 is a GPS navigation module, the module 40 receives signals from a constellation of GPS satellites 60. From these signals, the module 40 can determine vehicle position that is used for providing navigation and other position-related services to the vehicle driver. Further, the navigation module 40 may receive road information such as the type of road on which the vehicle is driving (e.g., dirt, gravel, paved, etc.), landmarks, points of interest, etc. Thus, the navigation module 40 may generate a navigation map. Navigation information can be presented on the display 38 (or other display within the vehicle) or can be presented verbally such as is done when supplying turn-by-turn navigation. The navigation services can be provided using a dedicated in-vehicle navigation module (which can be part of navigation module 40), or some or all navigation services can be done via telematics unit 30, wherein the position information is sent to a remote location such as remote server 16, for purposes of providing the vehicle with navigation maps, map annotations (points of interest, restaurants, etc.), route calculations, ambient weather conditions for the current vehicle location, and the like. The position information can be supplied to remote servers 16, for other purposes, such as fleet management.

Apart from the audio system 36 and navigation module 40, the vehicles 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests and perform other functions. As examples, one VSM 42 can be an engine control module (ECM) that controls various aspects of engine operation such as fuel injection, ignition timing, exhaust gas recirculation (EGR), grille shutter position, etc. As another example, another VSM 42 can be a powertrain control module that regulates operation of one or more components of the vehicle powertrain, and another VSM 42 can be a body control module that governs various electrical components located throughout the vehicle, like the vehicle's power door locks. According to one embodiment, the ECM is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicles 12, as numerous others are also possible.

Vehicle electronics 28 may also include a number of vehicle user interfaces that provide vehicle occupants with a means of providing and/or receiving information, such as microphone 32, pushbuttons(s) 34, audio system 36, and visual display 38. As used herein, the term 'vehicle user interface' broadly includes any suitable form of electronic device, including both hardware and software components, which is located on the vehicles 12 and enables a vehicle user to communicate with or through a component of the vehicles 12. In the description herein a vehicle user may also be referred to simply as a user, and/or a vehicle operator. The pushbutton(s) 34 allow manual user input into the telematics unit 30 to provide data, response, or control input. Audio system 36 provides audio output to a vehicle occupant and can be a dedicated, stand-alone system or part of the primary vehicle audio system. According to the particular embodiment shown in FIG. 1, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel, a pop-up visual display, or a heads-up display reflected off of the windshield, and can be used to provide a multitude of input and output functions. Various other vehicle user interfaces can also be utilized, as the interfaces of FIG. 1 are only an example of one particular implementation.

Remote servers 16 may be arranged in a network in a cloud computing configuration. The remote server 16 may therefore comprise one or more computing devices configured to receive, store, analyze, and transmit digital information. For example, the remote servers 16 may receive and store weather information, vehicle location information, vehicle operating data, etc. As one example, the weather data may be obtained from one or more weather service providers. Additionally or alternatively, the weather data may be received directly from one or more weather stations equipped with devices for measuring atmospheric weather conditions. As another example, vehicle location information may be obtained from the vehicles 12 and/or GPS satellites 60. Based on the vehicle location data, the servers 16 may send weather information to the vehicles 12 pertaining to the weather for the current vehicle location or location nearest the current vehicle location for which weather data is available. That is, the weather data stored by the servers 16 may include location information to which the weather data pertains. Said another way, the servers 16 may receive weather data from various weather stations and/or weather service providers, where the weather data includes the geographic location and/or region to which that weather data pertains. Thus, the weather data may include weather conditions such as humidity, temperature, precipitation, etc., and the associated geographic location and/or region to which those weather conditions correspond. Thus, the weather data may represent weather conditions for a geographical location and/or region. The weather data for the location and/or region nearest the current vehicle location may be transmitted to each of the vehicles 12.

The weather data, or weather information may include ambient temperature, relative humidity, precipitation amount, type of precipitation (e.g., rain, snow, hail, etc.), probability of precipitation, wind speed, wind direction, dew point, $CO_2$ or other greenhouse gas concentration in ambient air, etc. Further, the servers 16 may send inclement weather warnings to the vehicles 12 for warning a vehicle operator of upcoming road hazards, floods, storms, and potentially hazardous conditions.

Remote servers 16 may include a logic subsystem 82 and a data-holding subsystem 84. Remote servers 16 may optionally include a display subsystem 86, communication subsystem 88, and/or other components not shown in FIG. 2. For example, remote servers 16 may also optionally include user input devices such as keyboards, mice, game controllers, cameras, microphones, and/or touch screens.

The remote servers 16 may store data to be used by the vehicles 12 in the data-holding subsystem 84. For example, the remote servers 16 may store weather data such as temperature, humidity, precipitation, wind direction, wind speed, rain, snow, ice, altitude, dew point, etc., and may relay the weather data to the vehicles 12. Specifically, the weather data relayed to the vehicles 12 may correspond to weather data collected from a location closest to the current position of the vehicles 12. Thus, based on the current vehicle position, which may be obtained from the GPS Satellites 60, the remote servers 16 may relay weather data corresponding to the closest location to the vehicles 12 from which weather data has been obtained. In this way, an estimate of the current weather conditions may be provided to the vehicles 12 based on received weather data, and the current position of the vehicles 12 as obtained from one or more GPS devices included in the vehicles 12.

Logic subsystem 82 may include one or more physical devices configured to execute one or more instructions that may be stored in data-holding subsystem 84. For example, logic subsystem 82 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

Logic subsystem 82 may include one or more processors that are configured to execute software instructions. Additionally or alternatively, the logic subsystem 82 may include one or more hardware or firmware logic machines configured to execute hardware or firmware instructions. Processors of the logic subsystem 82 may be single or multi-core, and the programs executed thereon may be configured for parallel or distributed processing. The logic subsystem 82 may optionally include individual components that are distributed throughout two or more devices, which may be remotely located and/or configured for coordinated processing. For example, the logic subsystem 82 may include several engines for processing and analyzing data. These engines may be wirelessly connected to one or more databases for processing data received from one or more of the vehicles 12. One or more aspects of the logic subsystem 82 may be virtualized and executed by remotely accessible networked computing devices configured in a cloud computing configuration.

Data-holding subsystem 84 may include one or more physical, non-transitory devices configured to hold data and/or instructions executable by the logic subsystem 82 to implement the herein described methods and processes. When such methods and processes are implemented, the state of data-holding subsystem 84 may be transformed (for example, to hold different data).

Data-holding subsystem 84 may include removable media and/or built-in devices. Data-holding subsystem 84 may include optical memory (for example, CD, DVD, HD-DVD, Blu-Ray Disc, etc.), and/or magnetic memory devices (for example, hard drive disk, floppy disk drive, tape drive, MRAM, etc.), and the like. Data-holding subsystem 84 may include devices with one or more of the following characteristics: volatile, nonvolatile, dynamic, static, read/write, read-only, random access, sequential access, location addressable, file addressable, and content addressable. In some embodiments, logic subsystem 82 and data-holding subsystem 84 may be integrated into one or more common devices, such as an application-specific integrated circuit or a system on a chip.

It is to be appreciated that data-holding subsystem 84 includes one or more physical, non-transitory devices. In contrast, in some embodiments aspects of the instructions described herein may be propagated in a transitory fashion by a pure signal (for example, an electromagnetic signal) that is not held by a physical device for at least a finite duration. Furthermore, data and/or other forms of information pertaining to the present disclosure may be propagated by a pure signal.

Servers 16 may include one or more databases 85 in data-holding subsystem 84 for storing vehicle location data, weather data, vehicle and engine operating data, vehicle operator preferences, etc. Thus, one or more of the databases 85 may comprise a weather database.

When included, display subsystem 86 may be used to present a visual representation of data held by data-holding subsystem 84. As the herein described methods and processes change the data held by the data-holding subsystem 84, and thus transform the state of the data-holding subsystem 84, the state of display subsystem 86 may likewise be transformed to visually represent changes in the underlying data. Display subsystem 86 may include one or more display devices utilizing virtually any type of technology. Such display devices may be combined with logic subsystem 82 and/or data-holding subsystem 84 in a shared enclosure, or such display devices may be peripheral display devices.

When included, communication subsystem 88 may be configured to communicatively couple remote servers 16 with one or more other wireless devices, such as telematics unit 30 of vehicles 12. Communication subsystem 88 may include wired and/or wireless communication devices compatible with one or more different communication protocols. As non-limiting examples, communication subsystem 88 may be configured for communication via a wireless telephone network, a wireless local area network, a wired local area network, a wireless wide area network, a wired wide area network, etc. In some embodiments, communication subsystem 88 may allow remote servers 16 to send and/or receive messages to and/or from other devices via a network such as the public Internet.

In some examples, the relay towers 70 may be configured as part of a wireless cellular network. In such examples, the communications system 10 may include personal wireless devices 22 which can be, for example, cellular phones or other personal portable devices capable of wireless communication including, for the illustrated embodiment, SMS messaging capability. The devices 22 can communicate with the relay towers 70 to send and receive voice calls, SMS messages, and possibly other communications such as non-speech data for purposes of providing Internet access, weather information, location information, etc. Further, the telematics unit 30 of each of the vehicles 12 may be capable of sending and/or receiving SMS messages, and phone calls via the cellular network provided by the relay towers 70.

As such, telematics unit 30 may utilize cellular communication according to either GSM or CDMA standards and thus may include a standard cellular chipset for voice communications like hands-free calling.

Further, communications system may include one or more mobile switching centers (MSCs) 72, as well as any other networking components required to connect wireless carrier system 14 with remote servers 16. Each of the relay towers 70 may therefore include sending and receiving antennas and a base station, with the base stations from different cell towers being connected to the MSC 72 either directly or via intermediary equipment such as a base station controller. Wireless carrier system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Short message service center (SMSC) 24 is preferably in communication with relay towers 70 and is involved in the communication of SMS messages. SMSC 24 can operate according to a store-and-forward principal; that is, when a first user sends an SMS message that is intended for a second user, the SMS message gets stored at the SMSC until the second user is available to receive it. In other embodiments, the SMSC employs a store-and-forget approach where it only attempts to pass the SMS message along one time. These types of approaches enable users to send and receive SMS messages at any time, even if they are currently on a voice call. It should of course be appreciated that the exemplary representation of SMSC 24 is but one example of a suitable arrangement, as the SMSC could instead be provided according to some other configuration known in the art. In general, SMS messages sent to or from the vehicles 12 or wireless mobile devices 22 are received and/or transmitted by the relay towers 70, and pass through the MSC 72 and SMSC 24 for processing and routing to the remote servers 16.

Figure 2:
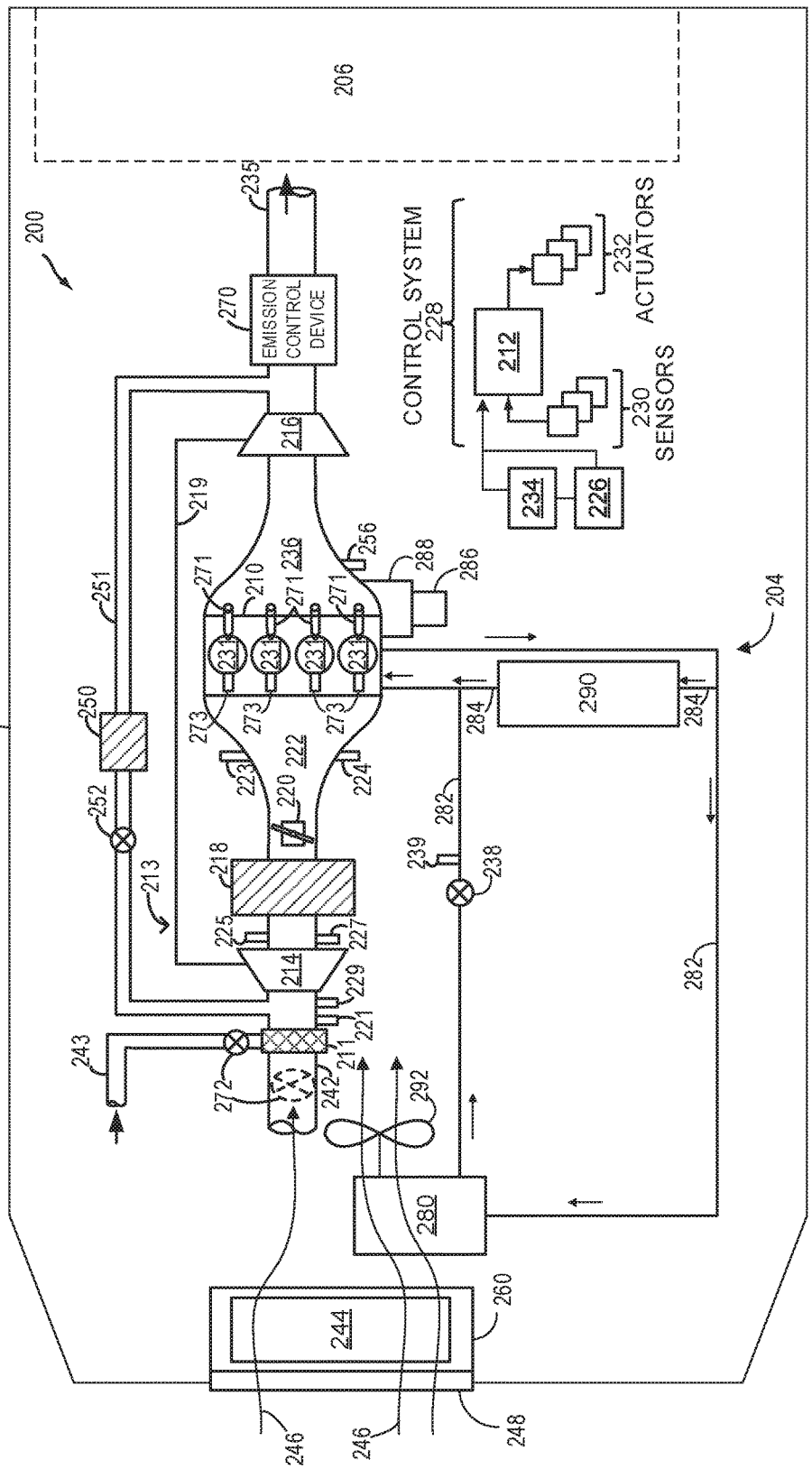
FIG. 2 shows a schematic diagram of a vehicle that may be included in the wireless vehicle communications system of FIG. 1, the vehicle including an engine system and a grille shutter system in accordance with one or more embodiments of the present disclosure.

FIG. 2 shows a schematic of an example engine system 200 that may be included in a vehicle 202, such as the vehicles 12 described above with reference to FIG. 1. Thus, Vehicle 202 may be the same or similar to vehicles 12 described above in FIG. 1. As such, engine system 200 may in some examples be included in the vehicles 12 described above in FIG. 1. Engine system 200 may be included in a vehicle such as a road vehicle, among other types of vehicles. While the example applications of engine system 200 will be described with reference to a vehicle, it should be appreciated that various types of engines and vehicle propulsion systems may be used, including passenger cars, trucks, etc.

Engine system 200 and/or other components of vehicle 202 may be controlled by a controller 212. Controller 212 may be the same or similar to VSM 42 described above with reference to FIG. 1. Thus, the controller 212 may receive wireless data such as weather data and vehicle location data from one or more remote servers (e.g., remote servers 16 described above with reference to FIG. 1), and may adjust operation of one or more of the components of vehicle 202 based on the received weather data.

In the depicted embodiment, engine 210 is a boosted engine coupled to a turbocharger 213 including a compressor 214 driven by a turbine 216. Fresh air may be introduced along intake passage 242 into engine 210 via air cleaner 211 and flows to compressor 214. Specifically, fresh air entering the vehicle 202 may enter the engine system 200 and flow through air cleaner 211 en route to intake manifold 222. As such, air entering the engine system 200 may be forced through the air cleaner 211 before flowing to the intake manifold 222. The air cleaner 211 may also be referred to herein as air filter 211, and may filter particulate matter and/or purify the air supplied to the engine 210.

In some examples, intake passage 242 may be positioned within a compartment of the vehicle 202 that houses the engine 210. Further, the intake passage 242 may receive air that enters the vehicle 202 via the grille 248. Thus a portion or all of the air introduced into the vehicle 202 via the grille 248 may be directed into the engine 210 via the intake passage 242. However, in other examples, the intake passage 242 may include its own source of airflow from exterior to the vehicle, and may be in fluidic communication with ambient airflow exterior to the vehicle 202 via grilles or other apertures in the vehicle other than the grille 248.

In yet further examples, the air cleaner 211 may be a two mode air cleaner, and may receive ambient airflow from two sources via more than one intake duct. Thus, the air cleaner 211 may receive airflow from a first source, such as grille 248, via intake passage 242. Additionally, in some examples, the air cleaner 211 may be coupled to a secondary intake passage 243, and may receive airflow from a second source, different than the first source, via the secondary intake passage 243. For example, the secondary intake passage 243 may be a snorkel that provides fluidic communication between the air cleaner 211 and ambient airflow outside of the vehicle 202, and more specifically to ambient airflow passing vertically above the engine compartment with respect to the ground in an on-road vehicle.

Depending on engine operating conditions and ambient weather conditions, the air cleaner 211 may draw in air from either the intake passage 242 or secondary intake passage 243, or both. Specifically, airflow into the air cleaner 211 may be regulated by an inlet valve 272. Inlet valve 272 may be positioned in either the intake passage 242 or secondary intake passage 243 for regulating the airflow there-through. In yet another example, the inlet valve 272 may be a three-way valve and may be positioned at a junction of the intake passage 242 and secondary intake passage 243. In yet a further examples, inlet valve 272 may be included within the air cleaner 211.

The air cleaner 211 may be operated in a protected first mode where the air cleaner 211 receives substantially all of the intake airflow from secondary passage 243 and not from intake passage 242. Thus, in the protected first mode, the air cleaner 211 may only receive intake air from a snorkel, and not from ram air received through grille 248. The air cleaner 211 may be switched to a ram air second mode, where the air cleaner 211 receives airflow from the intake passage 242. Switching of the air cleaner 211 between the first and second modes may be achieved by adjusting valve 272. In yet further examples, the air cleaner 211 may receive airflow from exhaust gasses in exhaust conduit 235 and may only receive airflow from exhaust conduit 235 during the protected first mode.

For example, when valve 272 is positioned in the intake passage 242, the valve 272 may be adjusted to a closed first position in the protected first mode of the air cleaner 211, where substantially no air flows through intake passage 242, and as such substantially all of the air entering the engine system 200 enters through the secondary intake passage 243. The valve 272 may be adjusted to an open second position in a ram air second mode of the air cleaner 211, where air enters the air cleaner 211 from both the intake passage 242 and secondary intake passage 243.

The compressor 214 may be a suitable intake-air compressor, such as a motor-driven or driveshaft driven supercharger compressor. In the engine system 200, the compressor is shown as a turbocharger compressor mechanically coupled to turbine 216 via a shaft 219, the turbine 216 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 2, compressor 214 is coupled, through charge air cooler (CAC) 218 to throttle valve (e.g., intake throttle) 220. The CAC 218 may be an air-to-air or air-to-coolant heat exchanger, for example. Throttle valve 220 is coupled to engine intake manifold 222. From the compressor 214, the hot compressed air charge enters the inlet of the CAC 218, cools as it travels through the CAC 218, and then exits to pass through the throttle valve to the intake manifold 222. Ambient airflow 246 from outside the vehicle 202 may enter engine 210 through a grille 248 at a vehicle front end and pass across the CAC 218, to aid in cooling the charge air. Condensate may form and accumulate in the CAC 218 when the ambient air temperature decreases, or during humid or rainy weather conditions, where the charge air is cooled below the water dew point. In one example, cool ambient airflow traveling to the CAC 218 may be controlled by the grille shutter system 260 such that condensate formation and engine misfire events are reduced. In another example, the source from which ambient air is inducted into the engine intake may be adjusted by adjusting a relative amount of air flowing through intake passage 242 and secondary intake passage 243 (e.g., via adjusting of valve 272).

In the embodiment shown in FIG. 2, the engine system 200 may include an ambient temperature sensor 221 for measuring a temperature of ambient air inducted into the engine system 200. For example, the temperature sensor 221 may be positioned between the air cleaner 211 and the compressor 214. Further, a humidity sensor 229 may be included between the air cleaner 211 and the compressor 214 for measuring a relative humidity of ambient airflow entering the engine system 200. For example, the humidity sensor 229 may be a variable voltage oxygen sensor that operates at a lower first voltage where water molecules are not dissociated, and then at a higher second voltage where water molecules are dissociated. A humidity of the ambient air may then be estimated based on the difference in the outputs from the sensor 229 at the two voltages. Thus, the engine system 200 may be equipped with sensors for measuring and/or estimating ambient temperature and humidity. However, it should be appreciated that in other examples, that the engine system 200 may not include sensor 221 and/or sensor 229, and that in some examples, the controller 212 may estimate the ambient temperature and/or humidity based on the wirelessly received weather data. In yet further examples, the controller 212 may estimate the ambient temperature and/or humidity based on a combination of the wirelessly received weather data and outputs from the sensors 221 and 229.

In the embodiment shown in FIG. 2, the pressure of the air charge within the intake manifold may be sensed by manifold air pressure (MAP) sensor 224 and a boost pressure may be sensed by boost pressure sensor 227. However in some examples sensor 224 and/or sensor 227 may not be included in the engine system 200. A compressor by-pass valve (not shown) may be coupled in series between the inlet and the outlet of compressor 214. The compressor by-pass valve may be a normally closed valve configured to open under selected operating conditions to relieve excess boost pressure. For example, the compressor by-pass valve may be opened during conditions of decreasing engine speed to avert compressor surge.

Additional sensors such as manifold charge temperature (MCT) sensor 223 and air charge temperature sensor (ACT) 225 may be included to determine the temperature of intake air at the respective locations in the intake passage. However, in other examples, sensor 223 and/or sensor 225 may not be included in the engine system 200. In some examples, the MCT and the ACT sensors may be thermistors and the output of the thermistors may be used to determine the intake air temperature in the passage 242. The MCT sensor 223 may be positioned between the throttle 220 and the intake valves of the combustion chambers 231. The ACT sensor 225 may be located upstream of the CAC 218 as shown, however, in alternate embodiments, the ACT sensor 225 may be positioned upstream of compressor 214. The air temperature may be further used in conjunction with an engine coolant temperature to compute the amount of fuel that is delivered to the engine, for example.

Intake manifold 222 is coupled to a series of combustion chambers 231 through a series of intake valves (not shown). In the example shown in FIG. 2, engine 210 includes four combustion chambers 231. However, it should be appreciated that in other examples, the engine 210 may include more or less than four combustion chambers 231.

Fuel injectors 271 are shown coupled directly to the combustion chambers 231 for injecting fuel directly therein in proportion to the pulse width of signal FPW received from controller 212. In this manner, the fuel injectors 271 provide what is known as direct injection of fuel into the combustion chambers 231; however it will be appreciated that port injection is also possible. Fuel may be delivered to the fuel injectors 271 by a fuel system (not shown) including a fuel tank, a fuel pump, and a fuel rail. Thus, each of the combustion chambers 231 may include a fuel injector, and as such in the example of FIG. 2, four fuel injectors 271 are shown. However, it should be appreciated that the number of fuel injectors may be more or less than four depending on the number of combustion chambers 231 included in the engine 210.

In a process referred to as ignition, the injected fuel is ignited by known ignition means such as spark plug 273, resulting in combustion. Thus, each of the combustion chambers 231 may include a spark plug 273. Each spark plug 273 may provide an electric spark that initiates combustion of the air/fuel mixture in each of the respective combustion chambers 231. The time at which the spark plug 273 provides the electric spark to initiate combustion may be referred to as the spark ignition timing. Specifically, spark ignition timing may be the point during the piston stroke at which the spark plug 273 provides the electric spark. Spark ignition timing may be controlled by the controller 212. In some examples, the spark ignition timing may be controlled such that the spark provided by the spark plug 273 occurs before (advanced) or after (retarded) the manufacturer's specified time. For example, spark timing may be retarded from maximum break torque (MBT) timing to control engine knock or advanced under high humidity conditions. MBT timing may refer to a spark ignition timing that occurs during the compression stroke (in a four-stroke engine) of the piston, before the piston has reached top dead center (TDC). The spark ignition timing may be adjusted to a position later in the compression stroke of the piston relative to MBT when retarding the spark ignition timing. Conversely, the spark ignition timing may be adjusted to a position earlier in the compression stroke of the piston relative to MBT when advancing the spark ignition timing.

Although shown in the example of FIG. 2 as a gasoline spark ignition engine, it should be appreciated that in some examples, engine system 200 may be configured as a diesel engine, and as such may not include spark plug 273. Thus, in some examples, the engine 210 may be configured as a self-ignition engine utilizing diesel fuel.

The combustion chambers 231 are further coupled to exhaust manifold 236 via a series of exhaust valves (not shown). Products of combustion from the combustion chambers 231 may be exhausted to the exhaust manifold 236. In the depicted embodiment, a single exhaust manifold 236 is shown. However, in other embodiments, the exhaust manifold may 236 include a plurality of exhaust manifold sections. Configurations having a plurality of exhaust manifold sections may enable effluent from different combustion chambers to be directed to different locations in the engine system. Universal Exhaust Gas Oxygen (UEGO) sensor 256 is shown coupled to exhaust manifold 36 upstream of turbine 216. Alternatively, a two-state exhaust gas oxygen sensor may be substituted for UEGO sensor 256.

As shown in FIG. 2, exhaust from the one or more exhaust manifold sections is directed to turbine 216 to drive the turbine 216. When reduced turbine torque is desired, some exhaust may be directed instead through a waste gate (not shown), by-passing the turbine. The combined flow from the turbine 216 and the waste gate then flows through emission control device 270. In general, one or more emission control devices 270 may include one or more exhaust after-treatment catalysts configured to catalytically treat the exhaust flow, and thereby reduce an amount of one or more substances in the exhaust flow.

All or part of the treated exhaust from emission control device 270 may be released into the atmosphere via exhaust conduit 235. Depending on operating conditions, however, some exhaust gasses may be diverted instead to an exhaust gas recirculation (EGR) passage 251, through EGR cooler 250 and EGR valve 252, to the inlet of compressor 214. In this manner, the compressor 214 is configured to admit exhaust tapped from downstream of turbine 216. The EGR valve 252 may be opened to admit a controlled amount of cooled exhaust gas to the compressor inlet for desirable combustion and emissions-control performance. In this way, engine system 200 is adapted to provide external, low-pressure (LP) EGR. The rotation of the compressor 214, in addition to the relatively long LP EGR flow path in engine system 200, provides homogenization of the exhaust gas into the intake air charge. Further, the disposition of EGR take-off and mixing points provides effective cooling of the exhaust gas for increased available EGR mass and improved performance. In other embodiments, the EGR system may be a high pressure EGR system with EGR passage 251 connecting from upstream of the turbine 216 to downstream of the compressor 214. In some embodiments, the MCT sensor 223 may be positioned to determine the manifold charge temperature, and may include air and exhaust recirculated through the EGR passage 251.

Motor vehicle 202 further includes a cooling system 204 that circulates coolant through internal combustion engine 210 to absorb waste heat and distributes the heated coolant to radiator 280 and/or heater core 290 via coolant lines 282 and 284, respectively. In particular, FIG. 2 shows cooling system 204 coupled to engine 210 and circulating engine coolant from engine 210 to radiator 280 via engine-driven water pump 286, and back to engine 210 via coolant line 282. Engine-driven water pump 286 may be coupled to the engine via front end accessory drive (FEAD) 288, and rotated proportionally to engine speed via belt, chain, etc. Specifically, engine-driven water pump 286 circulates coolant through passages in the engine block, head, etc., to absorb engine heat, which is then transferred via the radiator 280 to ambient air. In an example where engine-driven water pump 286 is a centrifugal pump, the pressure (and resulting flow) produced may be proportional to the crankshaft speed, which in the example of FIG. 2, is directly proportional to engine speed. In another example, a motor-controlled pump may be used that can be adjusted independently of engine rotation. The temperature of the coolant (e.g., engine coolant temperature, ECT) may be regulated by a thermostat valve 238, located in the cooling line 282, which may be kept closed until the coolant reaches a threshold temperature. In some examples, the ECT may be determined based on the thermostat valve opening. In other examples, a temperature sensor 239 may be positioned in the cooling line to measure ECT. As such, the temperature sensor 239 may be positioned upstream or downstream of the thermostat valve 238. However, in other examples, temperature sensor 239 may not be included in engine system 200.

Engine system 200 may include an electric fan 292 for directing cooling airflow toward the CAC 218, engine cooling system 204, or other engine system components. In some embodiments, electric fan 292 may be an engine cooling fan. The engine cooling fan may be coupled to radiator 280 in order to maintain airflow through radiator 280 when vehicle 202 is moving slowly or stopped while the engine is running. Fan rotation speed or direction may be controlled by a controller 212. In one example, a grille shutter system 260 may adjust the positions of the grille shutters 244 to allow ambient air entering the vehicle through a grille 248 by opening or closing the grille shutters 244. Grille shutters 244 located in front of the CAC 218 may be operated adaptively and/or continuously adjusted to cool the CAC 218.

Coolant may flow through coolant line 282, as described above, and/or through coolant line 284 to heater core 290 where the heat may be transferred to passenger compartment 206, and the coolant flows back to engine 210. In some examples, engine-driven water pump 286 may operate to circulate the coolant through both coolant lines 282 and 284.

FIG. 2 further shows a control system 228. Control system 228 may be communicatively coupled to various components of engine system 200 to carry out the control routines and actions described herein. For example, as shown in FIG. 2, control system 228 may include the electronic digital controller 212. Controller 212 may be a microcomputer, including a microprocessor unit, input/output ports, an electronic storage medium for executable programs and calibration values, random access memory, keep alive memory, and a data bus. As depicted, controller 212 may receive input from a plurality of sensors 230, which may include user inputs and/or sensors (such as transmission gear position, gas pedal input (e.g., pedal position), brake input, transmission selector position, vehicle speed, engine speed, mass airflow through the engine, boost pressure, ambient temperature from temperature sensor 221, ambient humidity from humidity sensor 229, intake air temperature, fan speed, etc.), cooling system sensors (such as ECT sensor 239, fan speed, passenger compartment temperature, ambient humidity, etc.), CAC 218 sensors (such as CAC inlet air temperature, ACT sensor 225 and pressure, CAC outlet air temperature, MCT sensor 223 and pressure sensors 224 and 227, etc.), and others. In addition, controller 212 may receive data from a GPS 234 and/or an in-vehicle communications and entertainment system 226 of vehicle 202. In one embodiment, based on the rate of change of ECT, controller may determine a future ECT and accordingly estimate first and a second grille shutter openings. Aerodynamic drag may be estimated at the two grille shutter positions, and the controller may set the final grille shutter position (between the first and the second grille shutter position) based on the estimated aerodynamic drag, as explained further below with reference to FIG. 3.

Furthermore, controller 212 may communicate with various actuators 232, which may include engine actuators (such as fuel injectors, an electronically controlled intake air throttle plate, spark plugs, etc.), cooling system actuators (such as air handling vents and/or diverter valves in the passenger compartment climate control system, etc.), the active grille shutters 244, and others. In some examples, the storage medium may be programmed with computer readable data representing instructions executable by the processor for performing the methods described below as well as other variants that are anticipated but not specifically listed.

The grille 248 of the motor vehicle 202 provides an opening (e.g., a grille opening, a bumper opening, etc.) for receiving ambient airflow 246 through or near the front end of the vehicle and into the engine compartment. Such ambient airflow 246 may then be utilized by radiator 280, electric fan 292, and other components to keep the engine and/or transmission cool. The grille shutter system 260 may include active grille shutters (AGS) 244 configured to adjust the amount of airflow received through grille 248. Further, the ambient airflow 246 may reject heat from the vehicle air conditioning system and can improve performance of turbocharged/super-charged engines that are equipped with CAC 218 that reduces the temperature of the air that goes into the intake manifold/engine. In one example, the electric fan 292 may be adjusted to further increase or decrease the airflow to the engine components.

Turning now to FIGS. 3-8, they show example methods for adjusting engine operating parameters based on vehicle sensors' outputs and/or wirelessly received weather data. The methods described below in FIGS. 3-8 may be stored in non-transitory memory of an engine controller (e.g., controller 212 described above in FIG. 2) and may be executed by the controller based on outputs from various engine and/or vehicle sensors such as an ambient temperature sensor (e.g., temperature sensor 221 described above in FIG. 2) and an ambient humidity sensor (e.g., humidity sensor 229 described above in FIG. 2). Additionally or alternatively, the engine controller may execute the methods based on wirelessly received weather data.

Focusing on FIG. 3, it shows a first method 300 for adjusting at least one engine operating parameters based on outputs from one or more engine sensors and/or wirelessly received weather data. Method 300 begins at 302 which comprises receiving outputs from one or more engine sensors corresponding to a weather parameter and/or engine operating conditions. The weather parameters may comprise measurements of ambient conditions of the vehicle including one or more of ambient humidity, ambient pressure, ambient temperature, precipitation amount, precipitation type, probability of precipitation, wind speed, wind direction, dew point, etc.

For example, the method 300 at 302 may comprise receiving outputs from the ambient temperature sensor corresponding to a measured temperature of inducted air, and/or outputs from the ambient humidity sensor corresponding to a measured humidity of the inducted air. In further examples, the method 300 at 302 may comprise receiving outputs from additional engine sensors such as various pressure sensors (e.g., pressure sensors 224 and 227 described above in FIG. 2), oxygen sensors (e.g., UEGO sensor 256 described above in FIG. 2), etc. Thus, at 302, the controller may estimate engine operating conditions based on the received outputs from the various engine sensors.

Further, in some examples, the method 300 at 302 may comprise generating models for predicted engine operating conditions based on the outputs received from the engine sensors. For example, the controller may generate models for outlet temperatures and/or efficiencies of one or more of a charge air cooler (e.g., CAC 218 described above in FIG. 2) and a radiator (e.g., radiator 280 described above in FIG. 2). Specifically, the outlet temperatures and/or efficiency models may be generated based outputs from the engine sensors such as air temperatures estimated from one or more temperature sensors, pressure levels as estimated from one or more pressure sensors, and humidity levels as estimated from one or more humidity sensors. For example, the outlet temperature and/or efficiency models for the radiator may be estimated based on one or more of a temperature of ambient air as estimated based on outputs from the ambient temperature sensor and/or an estimate of coolant temperature as estimated based on outputs from a coolant temperature sensor (e.g., temperature sensor 239 described above in FIG. 2). Future CAC outlet temperatures and/or efficiencies may be modeled based on one or more of a charge air temperature as estimated based on outputs from a charge air temperature sensor (e.g., temperature sensor 225 described above in FIG. 2), a relative humidity as estimated based on outputs from the humidity sensor, and a boost pressure as estimated based on a charge air pressure sensor (e.g., pressure sensor 227 described above in FIG. 2). Thus, the method 300 at 302 may additionally comprise predicting future engine operating conditions, and/or weather parameters based on the outputs received from the engine sensors.

Method 300 then continues from 302 to 304 which comprises determining the accuracy of each of the engine sensors' outputs received at 302. An example method for determining the accuracy of each engine sensor's outputs is described below with reference to FIG. 4. For example, the accuracy of outputs from the humidity sensor may be adjusted based on the ambient humidity and secondary exhaust gas flow such as an amount of exhaust gas recirculation. Method 300 may execute method 400 described below with reference to FIG. 4, at 304. Thus, method 400 of FIG. 4 may be executed as a subroutine of method 300 at 304.

Method 300 then continues to from 304 to 306 which comprises receiving weather data for at least the weather parameter measured by the one or more engine sensors at 302. Specifically, the weather data may include estimates of ambient conditions measured by the engine sensors at 302. For example, the weather data may include estimates of one or more weather parameters such as ambient temperature and ambient humidity. Thus, both engine sensors included in the engine system, and the weather data may provide estimates of one or more weather parameters.

Method 300 at 306 may comprise receiving the wireless weather data, the weather data comprising a plurality of different weather parameters, where the weather parameters provide an indication of the ambient conditions surrounding the vehicle. As described above with reference to FIG. 1, the weather data may be received by the controller via a wireless communication module (e.g., telematics unit 30 described above in FIG. 1) that wirelessly communicates with one or more remote servers (e.g., remote servers 16 described above in FIG. 1) that receive weather data from weather service providers and/or weather stations. The weather data received at 306 may correspond to weather conditions at a location nearest the current geographical location of the vehicle (e.g., vehicle 202 described above with reference to FIG. 2) from which weather measurements have been taken. Thus, the nearest available weather measurements to the current vehicle location may be received at 306. As such, weather measurements from the weather station nearest the current vehicle location may be received at 306. In other examples, the weather data received at 306 may correspond to predicted weather conditions at the current geographical location of the vehicle, where the predicted weather conditions may be estimated based on nearby weather measurements and one or more computer models.

After receiving the weather data at 306, method 300 then continues to 308 which comprises determining the accuracy of the received weather data. An example method for determining the accuracy of the received weather data is described below with reference to FIG. 5. For example, the accuracy of the weather data may be based on the distance between the location at which the weather data was measured and the current vehicle location. Method 300 may execute method 500 described below with reference to FIG. 5, at 308. Thus, method 500 of FIG. 5 may be executed as a subroutine of method 300 at 308.

Method 300 may then continue from 308 to 310 which comprises determining if the accuracy of the weather data estimated at 308 is greater than the accuracy of the engine sensor outputs determined at 304. Specifically, the method 300 at 310 may comprise determining if, for a particular weather parameter, the accuracy of the weather data is greater than the accuracy of the one or more engine sensors' outputs. As an example, the controller may determine whether the measurements of the ambient temperature obtained from the weather data, is more accurate than the measurements of the ambient temperature obtained from outputs of the ambient temperature sensor. As another example, the controller may determine whether the measurement of the ambient humidity obtained from the weather data, is more accurate than the measurement of the ambient humidity obtained from outputs of the ambient humidity sensor. As another example, the controller may determine whether the measurement of the ambient pressure obtained from the weather data, is more accurate than the measurement of the ambient pressure obtained from outputs of an ambient pressure sensor. It should be appreciated that the above examples are non-limiting examples of various weather parameters that may be measured by both an engine sensor and the received weather data, and that the accuracy of other weather parameters measured by both an engine sensor and the received weather data may be compared at 310 without departing from the scope of the method 300 herein. Thus, if measurements of a given weather parameter have been obtained from both the weather data and one or more engine sensors, then the method 300 proceeds to 310 and compares the accuracy of the two measurements.

Thus, method 300 may therefore comprise receiving a first measurement of a first weather parameter from one or more engine sensors, receiving a second measurement of said first weather parameter from wirelessly received weather data, determining accuracies of each of the first and second measurements, and comparing the accuracies of the first and second measurements. As such, the method 300 may additionally comprise determining if measurements for a given weather parameter have been received from both the weather data and one or more engine sensors. If a measurement for the weather parameter has only been obtained from one of the weather data or engine sensors, then the method 300 may adjust at least one engine operating parameter based on the obtained measurement. However, if measurements for a given weather parameter have been obtained from both the weather data and one or more engine sensors, then the method 300 may execute 310 and may compare the accuracies of the two measurements. Further, method 300 may proceed to compare the accuracy of the weather data to the outputs of one or more engine sensors for every weather parameter for which measurements have been obtained from both the weather data and the one or more vehicle sensors.

If it is determined at 310 that the accuracy of the weather data is not greater than the accuracy of the outputs from the one or more engine sensors, then method 300 may continue from 310 to 312 which comprises adjusting at least one engine operating parameter based on the outputs from the one or more engine sensors. In some examples, the method 300 at 312 may comprise not using the weather data to adjust at least one engine operating parameter. An engine operating parameter may include one or more of a fuel injection amount, a fuel injection timing, an EGR mass flow rate, position of an EGR valve (e.g., EGR valve 252 described above in FIG. 2), a spark timing, an induction air inlet path through an air cleaner (e.g., air cleaner 211 described above in FIG. 2), etc. FIGS. 6-8 show example methods for adjusting various engine operating parameters. For example, EGR flow and therefore a position of the EGR valve may be adjusted based on the ambient humidity as estimated based on outputs from the ambient humidity sensor. Method 300 then returns.

Returning to 310, if is it determined that the accuracy of the weather data is greater than the accuracy of the outputs from the one or more engine sensors, then method 300 may continue from 310 to 314 which comprises adjusting at least one engine operating parameter based on the received weather data. In some examples, the method 300 at 314 may comprise not using outputs from one or more engine sensors to adjust the least one engine operating parameter. Method 300 then returns.

Returning to 308, method 300 may additionally or alternatively proceed to 313 from 308 where the method 300 at 313 comprises determining if the weather data accuracy is less than a threshold. Thus, in some examples, method 300 may continue from 308 to 313 instead of continuing to 310.

As explained in greater detail below with reference to FIG. 5, the weather data accuracy may be reduced when one or more of the distance between the vehicle and the weather measurement location is greater than a threshold, a microclimate is detected, and a duration since the last weather data update is greater than a threshold. Thus, in some examples, if one or more of the distance between the vehicle and the weather measurement location is greater than a threshold, a microclimate is detected, and a duration since the last weather data update is greater than a threshold, then the weather data accuracy may be below the threshold. However, in other examples, the weather data accuracy may be below the threshold when two or more of the distance between the vehicle and the weather measurement location is greater than a threshold, a microclimate is detected, and a duration since the last weather data update is greater than a threshold. In yet further examples, the weather data accuracy may be below the threshold when the distance between the vehicle and the weather measurement location is greater than a threshold, a microclimate is detected, and a duration since the last weather data update is greater than a threshold.

In yet further examples, the amount that the weather data accuracy is reduced may depend on how far the vehicle is from the nearest weather measurement location, how severe the microclimate is (e.g., how much different the microclimate is than the surrounding climate), and how long it has been since the weather data has been updated. More specifically, the weather data accuracy may be reduced to a greater extent for greater distances between the vehicle and the nearest weather measurement location, more severe microclimates, and longer durations without a weather data update. Thus, the weather data accuracy may in some examples be below the threshold depending on how far the vehicle is from the nearest weather measurement location, how long it has been since the weather data has been updated, and whether or not the vehicle is in a microclimate.

If the weather data accuracy is less than the threshold at 313, then method 300 may continue from 313 to 312, and at least one engine operating parameter may be adjusted based on sensor outputs. Thus, if the weather data accuracy is less than the threshold, then the weather data may not be used to adjust the at least one engine operating parameter. Said another way, the method may comprise adjusting at least one engine operating parameter based only on engine sensor outputs when the weather data accuracy is determined to be less than the threshold. Method 300 then returns.

However, if at 313 it is determined that the weather data accuracy is not less than the threshold at 313, then method 300 may continue to 315 which comprises determining if the engine sensor accuracy is less than a threshold. For example, as explained in greater detail below with reference to FIG. 4, the accuracy of each engine and/or vehicle sensor may be evaluated independently depending on different engine operating conditions and/or ambient conditions. For example, the accuracy of outputs from the humidity sensor may be adjusted based on one or more of the ambient humidity level, secondary gas flow rates, etc. As another example, the accuracy of outputs from the temperature sensor may be adjusted based one or more of engine compartment temperature, engine temperature, ambient temperature, etc.

If it is determined at 315 that the sensor accuracy is less than the threshold, then method 300 may continue from 315 to 314 and at least one engine operating parameter may be adjusted based on the weather data. Thus, if the sensory accuracy is less than the threshold, then the sensor's outputs may not be used to adjust the at least one engine operating parameter. Said another way, the method may comprise adjusting at least one engine operating parameter based only on the wirelessly received weather data when the sensor accuracy is determined to be less than the threshold. Method 300 then returns.

However, if at 315 it is determined that the sensor accuracy is not less than the threshold, then method 300 may continue from 315 to 316 which comprises adjusting an estimate of the weather parameter based on the relative accuracies of the weather data and outputs from the one or more engine sensors. As such, the method 300 may in some examples use both the weather data and outputs from the one or more engine sensors to estimate the weather parameter instead of using either the weather data or the outputs from the one or more engine sensors as is done in 312 and 314, described above.

At 316, the method 300 comprises combining the first measurement of the weather parameter obtained from outputs of the one or more engine sensors with the second measurement of the weather parameter obtained from the weather data into an adjusted third estimate of the weather parameter. The combining the first and second measurements of the weather parameter may include taking an average of the two measurements. In further examples, the combining may include taking a weighted average, where the relative weighting of the two measurements is adjusted based on the accuracy of each of the measurements. For example, the adjusted third estimate may be closer to the first measurement than the second measurement if the accuracy of the first measurement is greater than the accuracy of the second measurement. More simply, the third estimate may be adjusted based on the accuracies of the first and second measurements, where the third estimate is weighted more heavily towards the first or second measurement with the higher accuracy. Further, the weighting of the first and second measurements may be adjusted based on one or more of previous accuracies of the measurements, accuracy trends of the measurements, and/or future predicted accuracies of the measurements.

After adjusting the estimate of the weather parameter based on the relative accuracies of the weather data and outputs from the one or more engine sensors at 316, method 300 may then continue to 318 which comprises adjusting at least one engine operating parameter based on the adjusted estimate of the weather parameter obtained at 316. Thus, the method 300 at 318 may comprise adjusting at least one engine operating parameter based on the weather data and the outputs from the one or more engine sensors. Specifically, the method 300 at 318 comprises adjusting at least one engine operating based on the adjusted third estimate of the weather parameter, where the third estimate of the weather parameter is determined based on both the weather data and outputs from the one or more engine sensors. Method 300 then returns.

It should be appreciated that a given estimate of a weather parameter, for example ambient temperature, may be used to adjust more than one engine operating parameter. For example, the ambient humidity may be used to adjust EGR flow and spark timing. Further, it should also be appreciated that a given engine operating parameter may be adjusted based on more than one weather parameter. For example, EGR flow may be adjusted based on ambient humidity, ambient temperature, dew point, precipitation rates, etc. As such, the weather parameters used to adjust a single engine operating parameter may be obtained from one or more engine sensors, or weather data, or both. For example, an engine operating parameter may be adjusted based on one or any combination of the following: one or more first weather parameters estimated based only on outputs from one or more engine sensors, one or more second weather parameters estimated based only on the received weather data, and one or more third weather parameters estimated based on a combination of the outputs from one or more engine sensors and the received weather data.

Thus, in one example, an engine operating parameter may be adjusted based on one or more first weather parameters estimated based only on outputs from one or more engine sensors. In other examples, an engine operating parameter may be adjusted based on one or more second weather parameters estimated based only on the received weather data. In another example, an engine operating parameter may be adjusted based on one or more third weather parameters estimated based on a combination of the outputs from one or more engine sensors and the received weather data. In yet another example, an engine operating parameter may be adjusted based on both of one or more first weather parameters estimated based only on outputs from one or more engine sensors and one or more second weather parameters estimated based only on the received weather data. In yet a further example, an engine operating parameter may be adjusted based on both of one or more first weather parameters estimated based only on outputs from one or more engine sensors and one or more third weather parameters estimated based on a combination of the outputs from one or more engine sensors and the received weather data. In another examples, an engine operating parameter may be adjusted based on both of one or more second weather parameters estimated based only on the received weather data and one or more third weather parameters estimated based on a combination of the outputs from one or more engine sensors and the received weather data. As yet another example, an engine operating parameter may be adjusted based on all of one or more first weather parameters estimated based only on outputs from one or more engine sensors, one or more second weather parameters estimated based only on the received weather data, and one or more third weather parameters estimated based on a combination of the outputs from one or more engine sensors and the received weather data.

In this way, a method may comprise receiving a first measurement of a first weather parameter from one or more engine sensors, receiving a second measurement of said first weather parameter from wirelessly received weather data, determining accuracies of each of the first and second measurements, comparing the accuracies of the first and second measurements, and adjusting at least one engine operating parameter based on the first measurement and/or the second measurement.

Turning now to FIG. 4, it shows an example method 400 for determining the accuracy of outputs of one or more engine sensors configured to measure a weather parameter. Method 400 may continue from 304 of method 300 described above in FIG. 3, and thus may be executed as a subroutine of method 300 at 304.

Method 400 begins at 402 which comprises determining if precipitation is occurring. Precipitation may comprise one or more of rain, snow, ice, hail, etc. Further, the method 400 at 402 may additionally comprise determining if precipitation is imminent (e.g., will occur within a threshold duration). More specifically, the method 400 at 402 comprises determining if precipitation is occurring at the current vehicle geographical location. Wirelessly received weather data may be used to determine if precipitation is occurring. Further, the received weather data may include the type of precipitation, and amount of precipitation (e.g., volumetric flow rate, mass flow rate, etc.).

If it is determined that precipitation is occurring at 402, then method 400 continues from 402 to 406 which comprises reducing the accuracy of estimated and/or predicted CAC and/or radiator outlet temperature and/or efficiency models. Thus, the accuracies of one or more of the estimated and/or predicted CAC and/or radiator outlet temperature and efficiency models generated at 302 of method 300 of FIG. 3, may be reduced at 406. The predicted efficiency models generated at 302 of method 300, may be based on outputs from one or more engine sensors that may not account for the effects of precipitation on CAC and/or radiator efficiency. Thus, as precipitation increases, the accuracy of the predicted efficiency models for the CAC and/or radiator that are based on outputs from the engine sensors may decrease. For example, CAC and/or radiator efficiency may increase with increasing precipitation levels. Thus, the predicted CAC and/or radiator efficiency models generated based on outputs from the one or more engine sensors may underestimate actual CAC and/or radiator efficiencies as precipitation increases.

In some examples, the accuracy of the predicted models may be reduced by a pre-set amount at 406. However, in other examples, the amount that the accuracy of the predicted models is reduced may be based on an amount of precipitation. Specifically, the accuracy of the predicted models may be reduced to a greater extent at higher precipitation rates.

Further, the method 400 at 406 may additionally comprise adjusting one or more of the CAC and/or radiator outlet temperature and/or efficiency models based on the precipitation information acquired from the wirelessly received weather data. Specifically, the models may be adjusted based on one or more of an amount of precipitation, type of precipitation, and future precipitation models. Specifically, the adjusting may comprise increasing the predicted efficiencies of one or more of the CAC and radiator for increasing precipitation rates. In this way, the accuracy of estimates of the CAC and/or radiator outlet temperatures and/or efficiency models may be increased. By increasing the accuracy of estimated CAC and/or radiator efficiencies, engine operating parameters such as fuel injection amount, fuel injection timing, spark timing, dilution rates, EGR flow, and boost may be more precisely controlled to desired levels, and thus engine performance may be increased and emissions may be reduced.

Method 400 may then continue from 406 to 408 which comprises determining if an engine compartment temperature is greater that a higher first threshold. Alternatively method 400 may proceed directly from 402 to 408 if it is determined at 402 that precipitation is not occurring. The engine compartment temperature may be a temperature of a portion or compartment of a vehicle (e.g., vehicle 202 described above in FIG. 2) that houses an engine (e.g., engine 210 described above in FIG. 2), and/or additional components of an engine system (e.g., engine system 200 described above in FIG. 2). As described above with reference to FIG. 2 the temperature may be estimated based on outputs from one or more temperature sensors included in the engine system (e.g., temperature sensors 221, 225, and 223). The higher first threshold may be a pre-set temperature that may be stored in non-transitory memory of the controller.

If the engine compartment temperature is greater than the higher first threshold, then method 400 continues from 408 to 412 which comprises reducing the accuracy of outputs from the ambient temperature sensor. The ambient temperature sensor may be affected by the engine compartment temperature. Specifically, the accuracy of the sensor may be reduced at engine compartment temperatures above the higher first threshold. Thus, the accuracy assigned to the outputs of the temperature sensor may be reduced when the engine compartment temperature is greater than the higher first threshold. In some examples, the accuracy of the outputs of the temperature sensor may be reduced by a pre-set amount. In some examples, the pre-set amount may be such that the accuracy of the ambient temperature sensor is reduced to below the threshold described above in 315 of method 300 in FIG. 3. Thus, in some examples, when the engine compartment temperature is greater than the higher first threshold, the accuracy of the ambient temperature sensor may be below the threshold described above in 315 of method 300 in FIG. 3.

However, in other examples, the amount that the accuracy of the ambient temperature sensor is reduced may be based on the engine compartment temperature, where the accuracy may be reduced to a greater extent for increasing engine compartment temperatures above the higher first threshold.

Returning to 408, if it is determined that the engine compartment temperature is not greater than the higher first threshold, then method 400 may continue from 408 to 414 which comprises determining if the engine compartment temperature is less than a lower second threshold. As described above, the ambient temperature sensor may be affected by the engine compartment temperature. Specifically, the accuracy of the sensor may be reduced at engine compartment temperatures below the lower second threshold. Thus, if it is determined at 414 that the engine compartment temperature is less than the lower second threshold, then method 400 may continue from 414 to 412 and reduce the accuracy of outputs of the ambient temperature sensor.

Thus, the accuracy assigned to the outputs of the temperature sensor may be reduced when the engine compartment temperature is less than the lower second threshold at 412. In some examples, the accuracy of the outputs of the temperature sensor may be reduced by a pre-set amount at 412. In some examples, the accuracy of the outputs of the temperature sensor may be reduced by a pre-set amount. In some examples, the pre-set amount may be such that the accuracy of the ambient temperature sensor is reduced to below the threshold described above in 315 of method 300 in FIG. 3. Thus, in some examples, when the engine compartment temperature is less than the lower second threshold, the accuracy of the ambient temperature sensor may be below the threshold described above in 315 of method 300 in FIG. 3.

However, in other examples, the amount that the accuracy is reduced may be based on the engine compartment temperature, where the accuracy may be reduced to a greater extent for decreasing engine compartment temperatures below the lower second threshold.

However, if at 414 it is determined that the engine compartment temperature is not less than the lower second threshold, and that that the engine compartment temperature is therefore between the higher first and lower second thresholds, then method 400 may continue from 414 to 416 which comprises adjusting the accuracy of the temperature sensor outputs based on the engine compartment temperature. Thus, in some examples, the accuracy of the temperature sensor outputs determined at 304 of method 300 described above in FIG. 3, may be maintained at approximately the same accuracy at 416. However, in other examples, the accuracy of the temperature sensor outputs determined at 304 may be adjusted based on changes in the engine compartment temperature between the first and second thresholds. For example, the accuracy of the temperature sensor may depend on the actual temperature level. The controller may include a look-up table that includes a relationship between temperature levels and temperature sensor accuracies. Thus, the controller may use the look-up table to adjust the accuracy of the sensor based on the measured temperature.

Method 400 then continues from either 416 or 412 to 418 which comprises determining if ambient humidity is greater than a threshold. The ambient humidity may be estimated by a humidity sensor (e.g., humidity sensor 229 described above in FIG. 2) included in the engine system. Additionally or alternatively the ambient humidity may be estimated based on the wirelessly received weather data. The threshold at 418 may be a pre-set threshold that may be stored in non-transitory memory of the controller. However, in other examples, the threshold at 418 may be adjusted based on engine operating conditions such as engine compartment temperature. Thus, the amount that humidity affects the accuracy of the humidity sensor may depend on engine operating conditions.

The ambient humidity sensor may be affected by the humidity. Specifically, the accuracy of the sensor may be reduced at humidity levels above the threshold. Thus, if it is determined at 418 that the humidity is greater than the threshold, then method 400 may continue from 418 to 420 which comprises reducing the accuracy assigned to the humidity sensor. In some examples, the accuracy of the outputs of the ambient humidity sensor may be reduced by a pre-set amount at 420. In some examples, the pre-set amount may be such that the accuracy of the ambient humidity sensor is reduced to below the threshold described above in 315 of method 300 in FIG. 3. Thus, in some examples, when the ambient humidity is greater than the threshold, the accuracy of the ambient humidity sensor may be reduced to below the threshold described above in 315 of method 300 in FIG. 3.

However, in other examples, the amount that the accuracy of the ambient humidity sensor is reduced may be based on the ambient humidity, where the accuracy may be reduced to a greater extent for increasing humidity levels above the threshold.

Returning to 418, if it is determined that the humidity is not greater than the threshold, then method 400 may continue from 418 to 422 which comprises adjusting the accuracy of the humidity sensor based on the estimated humidity. Thus, in some examples, the accuracy of the ambient humidity sensor outputs determined at 304 of method 300 described above in FIG. 3, may be maintained at approximately the same accuracy at 422. However, in other examples, the accuracy of the humidity sensor outputs determined at 304 may be adjusted based on changes in the humidity. For example, the accuracy of the humidity sensor may depend on the actual humidity level. The controller may include a look-up table that includes a relationship between humidity levels and humidity sensor accuracies. Thus, the controller may use the look-up table to adjust the accuracy of the sensor based on the measured humidity.

Method 400 may then continue from either 422 or 420 to 424 which comprises determining if a secondary gas flow is greater than a threshold. The secondary gas flow may include gas flow into the intake manifold (e.g., intake manifold 222 described above in FIG. 2) of the engine system from a source other than from ambient airflow through the air cleaner. Thus, the secondary gas flow may include one or more of low-pressure exhaust gas recirculation (LP EGR), high-pressure exhaust gas recirculation (HP EGR), positive crankcase ventilation (PCV) gasses, fuel vapor purge gasses from an evaporative emissions control (EVAP) system, etc. An amount of EGR flow may be determined based on a position an EGR valve (e.g., EGR valve 252 described above with reference to FIG. 2) positioned in an EGR passage (e.g., passage 251 described above in FIG. 2), a pressure differential across the valve, a difference in pressure between where the EGR passage is coupled to in an exhaust passage (e.g., exhaust conduit 235 described above with reference to FIG. 2) and an intake passage (e.g., intake passage 242 described above in FIG. 2), etc. PCV flow may be estimated based on a position of a PCV valve and a pressure differential between a crankcase and the intake manifold. Purge flow may be estimated based on a position of a canister purge valve (CPV) and/or a pressure differential between a fuel vapor canister and the intake manifold. In some examples the threshold at 424 may represent a pre-set secondary gas flow rate (e.g., mass flow rate or volumetric flow rate). However, in other examples, the threshold at 424 may be adjusted based on engine operating conditions such as humidity, dilution rate, spark timing, CAC efficiency, etc.

If the secondary gas flow is greater than the threshold at 424, method 400 may continue from 424 to 426 which comprises reducing the accuracy assigned to the humidity sensor. In some examples, the accuracy of the outputs of the humidity sensor may be reduced by a pre-set amount at 426. In some examples, the pre-set amount may be such that the accuracy of the ambient humidity sensor is reduced to below the threshold described above in 315 of method 300 in FIG. 3. Thus, in some examples, when the ambient humidity is greater than the threshold, the accuracy of the ambient humidity sensor may be reduced to below the threshold described above in 315 of method 300 in FIG. 3.

However, in other examples, the amount that the accuracy is reduced may be based on the secondary gas flow rate, where the accuracy may be reduced to a greater extent for increasing secondary gas flow rates above the threshold.

In yet further examples, the accuracy of the humidity sensor may only be reduced to below the threshold described above in 315 of method 300 in FIG. 3, when both the humidity is greater than the threshold, and the secondary gas flow is greater than the threshold.

Returning to 424, if it is determined that the secondary gas flow rate is not greater than the threshold, then method 400 may continue from 424 to 428 which comprises adjusting the accuracy of the humidity sensor based on the secondary gas flow rate. Thus, in some examples, the accuracy of the ambient humidity sensor outputs determined at 304 of method 300 described above in FIG. 3, may be maintained at approximately the same accuracy at 428. However, in other examples, the accuracy of the humidity sensor outputs determined at 304 may be adjusted based on changes in the secondary gas flow rate. For example, the accuracy of the humidity sensor may depend on the actual secondary gas flow rate. The controller may include a look-up table that includes a relationship between secondary gas flow rates and humidity sensor accuracies. Thus, the controller may use the look-up table to adjust the accuracy of the sensor based on the measured secondary gas flow rate.

Method 400 may then continue from either 426 or 428 to 430 which comprises determining if the wind speed is greater than a threshold. Wind speed may represent the velocity (e.g., speed and direction) of wind relative to a stationary observer. In other examples, the wind speed may represent the relative velocity of wind with respect to the vehicle as the vehicle is moving. Wind speed may be estimated based on the wirelessly received weather data and/or estimates of current vehicle speed. The wind speed threshold may represent a pre-set wind speed stored in non-transitory memory of the controller. If it is determined at 430 that the wind speed is greater than the threshold, then method 400 may continue from 430 to 432 which comprises reducing the accuracy of estimated and/or predicted CAC and/or radiator outlet temperature and/or efficiency models. Thus, the accuracies of one or more of the estimated and/or predicted CAC and/or radiator outlet temperature and efficiency models generated at 302 of method 300 of FIG. 3, may be reduced at 432. The predicted efficiency models generated at 302 of method 300, may be based on outputs from one or more engine sensors that may not account for the effects of wind speed on CAC and/or radiator efficiency. Thus, as wind speed increases, the accuracy of the predicted efficiency models for the CAC and/or radiator that are based on outputs from the engine sensors may decrease. For example, CAC and/or radiator efficiency may increase with increasing wind speeds. Thus, the predicted CAC and/or radiator efficiency models generated based on outputs from the one or more engine sensors may underestimate actual CAC and/or radiator efficiencies as wind speed increases.

In some examples, the accuracy of the predicted models may be reduced by a pre-set amount at 432. However, in other examples, the amount that the accuracy of the predicted models is reduced may be based on a velocity of the wind. Specifically, the accuracy of the predicted models may be reduced to a greater extent at higher wind speeds.

Further, the method 400 at 406 may additionally or alternatively comprise adjusting one or more of the CAC and/or radiator outlet temperature and/or efficiency models based on the wind speed information acquired via the wirelessly received weather data. Specifically, the models may be adjusted based on one or more of wind speed, wind direction, vehicle speed, vehicle direction, and future wind velocity and vehicle trajectory models. Specifically, the adjusting may comprise increasing the predicted efficiencies of one or more of the CAC and radiator for increasing relative wind speeds of the wind and vehicle. In this way, the accuracy of estimates of the CAC and/or radiator outlet temperatures and/or efficiency models may be increased. By increasing the accuracy of estimated CAC and/or radiator efficiencies, engine operating parameters such as fuel injection amount, fuel injection timing, spark timing, dilution rates, EGR flow, and boost may be more precisely controlled to desired levels, and thus fuel efficiency and engine performance may be increased and emissions may be reduced. Method 400 then returns.

Returning to 430, if the wind speed is not greater than the threshold at 430, then method 400 continues from 430 to 434 which comprises adjusting the accuracy assigned to the predicted CAC and/or radiator outlet temperature and/or efficiency models based on the wind speed. Specifically, the accuracy may be adjusted based on the relative velocity between the vehicle and ambient airflow. The controller may include a look-up table that includes a relationship between relative wind velocities and CAC and/or radiator efficiency and/or outlet temperature model accuracies. Thus, the controller may use the look-up table to adjust the accuracy of one or more of the models based on the wind velocity. Method 400 then returns.

In this way, a method may comprise adjusting an accuracy of a first measurement of a first weather parameter, the first measurement obtained from one or more engine sensors, based on one or more engine operating conditions and/or one or more ambient conditions. More specifically, the method may comprise reducing the accuracy of an ambient temperature measurement obtained from outputs from an ambient temperature sensor in response to the ambient temperature measurement increasing above a higher first threshold and/or decreasing below a lower second threshold. The method may additionally or alternatively comprise reducing the accuracy of an ambient humidity measurement obtained from outputs from an ambient humidity sensor in response to the ambient humidity measurement increasing above a threshold and/or a secondary gas flow into an intake manifold increasing above a threshold.

Turning now to FIG. 5, it shows an example method 500 for determining the accuracy of wirelessly received weather data including one or more measurements of at least one weather parameter. More simply, method 500 may be executed to determine the accuracy of a measurement of a weather parameter obtained from wirelessly received weather data. Method 500 may continue from 308 of method 300 described above in FIG. 3, and thus may be executed as a subroutine of method 300 at 308.

Method 500 begins at 502 which comprises determining if the distance to a nearest location from which a weather measurement, included in the weather data, was obtained is greater than a threshold. As explained above with reference to FIGS. 1-3, the weather data, and weather measurements included therein, may be obtained from a weather station equipped with devices for measuring atmospheric conditions. However, the distance between the vehicle and the nearest weather station may change during vehicle operation as the vehicle is driven. Further, as the vehicle changes location, the weather station that is nearest the vehicle may change. Thus, more specifically, the method 500 at 502 may comprise determining a distance between the nearest weather station from which the weather data and weather measurement were obtained, and the current vehicle location. The distance may be computed based on the current geographical location of the vehicle as determined from a vehicle navigation system (e.g., navigation module 40 described above in FIG. 1), and a second geographical location of the nearest weather station from which the weather data and weather measurement were obtained.

If the distance between the current vehicle location and the and location of the nearest weather station from which the weather data and weather measurements were obtained is greater than the threshold at 502, then method 500 may continue from 502 to 504 which comprises reducing the accuracy of the weather data. In some examples, the accuracy of the weather data may be reduced by a pre-set amount. In some examples, the pre-set amount may be such that the accuracy of the weather data is reduced to below the threshold described above in 313 of method 300 in FIG. 3. Thus, in some examples, when the distance between the vehicle and the nearest weather measurement is greater than the threshold, the accuracy of the weather data may be below the threshold described above in 313 of method 300 in FIG. 3. However, in other examples, the pre-set amount may be less than what would cause the accuracy of the weather data to drop below the threshold described above in 313 of method 300 in FIG. 3. Thus, in some examples, when the distance between the vehicle and the nearest weather measurement is greater than the threshold, the accuracy of the weather data may be above the threshold described above in 313 of method 300 in FIG. 3.

However, in other examples, the amount that the accuracy of the weather data is reduced may be based on the distance between the current vehicle location and the weather station, where the accuracy may be reduced to a greater extent for increasing distances above the threshold. In some examples, the method 500 at 504 may comprise reducing the accuracy of one or more measurements of exactly one weather parameter. However, in other examples, the method 500 at 504 may comprise reducing the accuracy of one or more measurements of more than one weather parameter. In yet further examples, the method 500 at 504 may comprise reducing the accuracy of substantially all of the measurements of the weather parameters included in the weather data. Thus, in some examples, the accuracy of substantially all of the most recently received weather data may be reduced. In yet further examples, the accuracies of the weather parameters may be reduced in a non-uniform manner. Thus, the accuracies of measurements of a first weather parameter may be reduced more than a second weather parameter. For example, the weather data may in some examples be received from more than one weather station. In such examples, the accuracy of the received data may be adjusted based on the distance between the current vehicle location and the location of each of the weather stations from which weather data was received.

However, if it is determined at 502 that the distance to the nearest weather measurement is not greater than the threshold, then method 500 continues from 502 to 506 which comprises adjusting the accuracy of the weather data based on the distance between the vehicle location and the weather measurement location. For example, the accuracy of the weather data may increase with decreasing distance between the vehicle location and the weather measurement location. Thus, as the vehicle approaches a weather station, the accuracy of the weather data may increase, and as the vehicle gets farther away from a weather station, the accuracy of the weather data may decrease. The controller may include a look-up table that includes a relationship between weather data accuracies and distance from the vehicle to the nearest weather measurement. Thus, the controller may use the look-up table to adjust the accuracy of one or more of the measurements of the weather parameters included in the weather data.

Method 500 may then proceed from either 504 or 506 to 508 which comprises determining if a microclimate has been detected. As explained above with reference to FIGS. 1-2, a microclimate may include an area, man-made structure, terrain, natural structure, etc., where the ambient conditions at the specific vehicle location may be different than the average ambient conditions for the regional location in which the vehicle is positioned. For example, a microclimate may include one or more of a covered area, puddle, car wash, tunnel, stream or river, parking garage, bridge, gorge, etc.

In one example a microclimate may be detected based on the geographical location of the vehicle as determined via the navigation system. For example, it may be determined via the current vehicle location and a web map service that the vehicle is within a building or parking structure. The web map service may be a mapping service that provides one or more of satellite imagery, street maps, panoramic views, real-time traffic conditions, etc. Thus, using the web map service, the controller may determine if the vehicle is in a microclimate. In further examples, a microclimate may be detected based on a difference between one or more first measurements of a first weather parameter obtained from one or more engine sensors, and one or more second measurements of the first weather parameter obtained from the weather data. Thus, if for a given weather parameter, the measurements of said weather parameter from the weather data differ by more than a threshold amount from measurements of the weather parameter obtained from one or more engine sensors, then a microclimate may be detected.

If a microclimate is detected at 508, then method 500 may proceed from 508 to 510 which comprises reducing the accuracy of the weather data. In some examples, the method 500 at 510 may comprise reducing the accuracy of one or more measurements of exactly one weather parameter. However, in other examples, the method 500 at 510 may comprise reducing the accuracy of one or more measurements of more than one weather parameter. In yet further examples, the method 500 at 510 may comprise reducing the accuracy of substantially all of the measurements of the weather parameters included in the weather data. Thus, in some examples, the accuracy of substantially all of the most recently received weather data may be reduced. In yet further examples, the accuracy of the weather data for a weather parameter may be reduced by an estimated severity of the microclimate. Specifically, the accuracy of the weather data may be reduced to greater extents for increasing microclimate severities. The severity of the microclimate may be an estimated difference in ambient conditions between the microclimate and the surrounding environment. The severity of the microclimate may be estimated based on the difference between measurements of said weather parameter obtained from the weather data and from the one or more engine sensors. Thus, the severity of the microclimate may be estimated to be greater for greater differences between the measurements of the weather parameter obtained from the weather data, and measurements of the weather parameter obtained from the one or more engine sensors. As such, the accuracy of the weather data may be reduced for increasing differences above the threshold between the weather data measurements and the engine sensor measurements of the weather parameter.

In some examples, the accuracy of the weather data may be reduced at 510 by a pre-set amount. In some examples, the pre-set amount may be such that the accuracy of the weather data is reduced to below the threshold described above in 313 of method 300 in FIG. 3. Thus, in some examples, when a microclimate is detected, the accuracy of the weather data may be reduced to below the threshold described above in 313 of method 300 in FIG. 3. However, in other examples, the pre-set amount may be less than what would cause the accuracy of the weather data to drop below the threshold described above in 313 of method 300 in FIG. 3. Thus, in some examples, when a microclimate is detected, the accuracy of the weather data may be above the threshold described above in 313 of method 300 in FIG. 3.

In yet further examples, the accuracy of the weather data may be reduced to below the threshold described above in 313 of method 300 in FIG. 3, when both a microclimate has been detected, and the distance to the weather measurement is greater than the threshold, and not when a microclimate has been detected but the distance to the weather measurement is not greater than the threshold or when the distance to the weather measurement is greater than the threshold but a microclimate has not been detected.

Method 500 may then continue from 510 to 512 which comprises determining if a duration since a most recent weather data update is greater than a threshold. Alternatively method 500 may proceed to 512 from 508 if a microclimate is not detected at 508.

As explained above with reference to FIG. 1, the vehicle may receive regular weather data updates. However, if wireless communication is lost between the vehicle and one or more remote servers (e.g., servers 16 described above in FIG. 1), then the weather data may not be updated until wireless communication with the remote servers is re-established. In some examples, the weather data may be updated continuously when wireless communication is established between the vehicle and the one or more remote servers. In other examples, the updates may occur periodically or at regularly scheduled time intervals. The threshold at 512 may represent a time interval longer than the regularly scheduled time interval at which weather data is updated when wireless communication is established between the vehicle and the one or more remote servers. However, in other examples, the threshold at 512 may represent a time interval shorter than the regularly scheduled time interval at which weather data is updated when wireless communication is established between the vehicle and the one or more remote servers.

If the duration since the last weather data update is greater than the threshold at 512, method 500 may continue from 512 to 514 which comprises reducing the accuracy of the weather data. In some examples, the weather data accuracy may be reduced by a pre-set amount at 514. In some examples, the pre-set amount may be such that the accuracy of the weather data is reduced to below the threshold described above in 313 of method 300 in FIG. 3. Thus, in some examples, when the duration since the most recent weather data update is greater than a threshold, the accuracy of the weather data may be reduced to below the threshold described above in 313 of method 300 in FIG. 3. However, in other examples, the pre-set amount may be less than what would cause the accuracy of the weather data to drop below the threshold described above in 313 of method 300 in FIG. 3. Thus, in some examples, when the duration since the most recent weather data update is greater than a threshold, the accuracy of the weather data may be above the threshold described above in 313 of method 300 in FIG. 3.

In yet further examples, the accuracy of the weather data may be reduced to below the threshold described above in 313 of method 300 in FIG. 3, when all of a microclimate has been detected, the distance to the weather measurement is greater than the threshold, and the duration since the most recent weather data update is greater than a threshold and not when a microclimate has been detected and the duration since the last weather data update is greater than a threshold but the distance to the weather measurement is not greater than the threshold, or when the distance to the weather measurement is greater than a threshold and the duration since the last weather data update is greater than a threshold but a microclimate has not been detected, or when a microclimate has been detected and the distance to the weather measurement is greater than the threshold, but the duration since the most recent weather data update is not greater than the a threshold.

However, in other examples, the accuracy of the weather data may be reduced to below the threshold described above in 313 of method 300 in FIG. 3, when the duration since the last weather data update is greater than the threshold and one or more of a microclimate has been detected and/or the distance to the weather measurement is greater than the threshold. Thus, in some examples, the accuracy of the weather data may not be reduced to below the threshold described above in 313 of method 300 in FIG. 3 when only one of a microclimate has been detected, the distance to the weather measurement is greater than the threshold or the duration since the most recent weather data update is greater than the threshold. Thus, in some examples, the accuracy of the weather data may be reduced to below the threshold described above in 313 of method 300 in FIG. 3, when at least two or more of the duration since the last weather data update is greater than the threshold, a microclimate has been detected and/or the distance to the weather measurement is greater than the threshold.

In yet further examples, the accuracy of the weather data may be reduced to below the threshold described above in 313 of method 300 in FIG. 3, when one or more of the duration since the last weather data update is greater than the threshold, a microclimate has been detected and/or the distance to the weather measurement is greater than the threshold.

In this way, the accuracy of the weather data may be adjusted based on one or more of the distance to the weather measurement, microclimate, and duration since the most recent weather data update. This final adjusted accuracy may then be compared to the threshold described above at 313 of method 300 in FIG. 3.

In some examples, the method 500 at 514 may comprise reducing the accuracy of one or more measurements of exactly one weather parameter. However, in other examples, the method 500 at 514 may comprise reducing the accuracy of one or more measurements of more than one weather parameter. In yet further examples, the method 500 at 514 may comprise reducing the accuracy of substantially all of the measurements of the weather parameters included in the weather data. Thus, in some examples, the accuracy of substantially all of the most recently received weather data may be reduced by a pre-set amount. In yet further examples, the accuracy of the weather data for a weather parameter may be reduced by an amount based on the duration since the most recent weather data update. Specifically, the accuracy of the weather data may be reduced to a greater extent for increasing durations since the last weather data update above the threshold. Method 500 then returns.

Alternatively, if at 512 it is determined that the duration since the most recent weather data update is less than the threshold, method 500 may continue from 512 to 516 which comprises adjusting the weather data accuracy based on the duration since the most recent weather data update. Specifically, the accuracy of the weather data may increase as the time since the most recent update decreases. Thus, the more recent the weather data update, the more accurate the weather data may be. Method 500 then returns.

FIGS. 6-8 show example methods for adjusting engine operating parameters based on either wirelessly received weather data or outputs from one or more engine sensors, or both. Thus, the methods shown in FIG. 6-8 represent example methods for adjusting at least one engine operating parameter based on one or more of weather data and engine sensor outputs as explained above in 312, 314, and 318 of method 300 in FIG. 3. Thus, any one or more of the methods described in FIG. 6-8 may be executed at one or more of 312, 314, and 318 of method 300 in FIG. 3. Thus, methods 600, 700, and 800, in FIGS. 6, 7, and 8, respectively, may be executed as a subroutine of method 300 at one or more of 312, 314, and 318.

The engine operating parameters may include one or more of EGR flow, spark timing, fuel injection timing, fuel injection amount, CAC efficiency models, CAC outlet temperature models, radiator efficiency models, radiator outlet temperature models, induction air flow path, air cleaner operation, underbody temperature around the exhaust system, etc. Specifically, FIG. 6 shows an example method 600 for adjusting EGR flow, spark timing, and/or injection timing, FIG. 7 shows an example method 700 for adjusting grille shutter operation, and FIG. 8 shows an example method for adjusting operation of a two-mode air cleaner.

Focusing on FIG. 6, it shows an example method 600 for adjusting EGR flow, spark timing, and/or injection timing. Method 600 begins at 602 which comprises adjusting predicted CAC and/or radiator outlet temperature and/or efficiency models based on the weather data and/or engine sensor outputs. Thus, in some examples, one or more of the CAC efficiency, CAC outlet temperature, radiator efficiency, and radiator efficiency models may be determined based on only received weather data at 602. For example, one or more of the models may be determined based on one or more of ambient temperature, ambient humidity, precipitation amount, precipitation type, etc. In other examples, one or more of the CAC efficiency, CAC outlet temperature, radiator efficiency, and radiator efficiency models may be determined based on only one or more engine sensor outputs at 602. For example, one or more of the models may be determined based on outputs from one or more of the ambient temperature sensor, ambient humidity sensor, coolant temperature sensor, one or more of the pressure sensors, etc. In other examples, one or more of the CAC efficiency, CAC outlet temperature, radiator efficiency, and radiator efficiency models may be determined based on a combination of weather data and one or more engine sensors' outputs as described in greater detail above with reference to 318 of FIG. 3.

Method 600 then continues from 602 to 604 which comprises determining if ambient temperature is greater than a higher first threshold. The higher first threshold may be a pre-set temperature that may be stored in non-transitory memory of the controller. In other examples, the first threshold may be adjusted based on engine operating conditions. If the ambient temperature is greater than the higher first threshold, then method 600 continues from 604 to 606 which comprises reducing EGR flow. EGR flow may be reduced by adjusting the position of an EGR valve (e.g., EGR valve 252 described above in FIG. 2) towards a more closed position. EGR flow may be reduced by a pre-set amount at 606. In other examples, the amount that the EGR flow is reduced may be based on the ambient temperature, where the EGR flow may be reduced to a greater extent for increasing ambient temperatures above the higher first threshold.

However, if at 604 the ambient temperature is not greater than the higher first threshold, then method 600 continues from 604 to 608 which comprises determining if the ambient temperature is less than a lower second threshold. The lower second threshold may be a pre-set temperature that may be stored in non-transitory memory of the controller. In other examples, the second threshold may be adjusted based on engine operating conditions. If the ambient temperature is less than the lower second threshold, then method 600 continues from 608 to 606 which comprises reducing EGR flow. EGR flow may be reduced by adjusting the position of an EGR valve (e.g., EGR valve 252 described above in FIG. 2) towards a more closed position. EGR flow may be reduced by a pre-set amount at 606. In other examples, the amount that the EGR flow is reduced may be based on the ambient temperature, where the EGR flow may be reduced to a greater extent for decreasing ambient temperatures below the lower second threshold.

However, if at 608 it is determined that the ambient temperature is not less than the lower second threshold, and that the ambient temperature is therefore between the lower second and higher first thresholds, then method 600 may continue from 608 to 610 which comprises adjusting EGR based on the ambient temperature. Specifically, the controller may include a look-up table that includes a relationship between EGR flow rates and ambient temperatures. Thus, the controller may use the look-up table to determine a desired EGR flow rate based on the ambient temperature, and then may adjust the EGR valve to achieve the desired EGR flow rate.

Method may then continue from either 610 or 606 to 612 which comprises determining a current dew point in the CAC. In some examples, the dew point may be provided in the weather data. In other examples, the dew point may be calculated based on the ambient humidity and a pressure in the CAC which may be estimated via outputs from a boost pressure sensor (e.g., boost pressure sensor 227 described above in FIG. 2), and an amount of EGR flow which may be determined based on a position of the EGR valve and a pressure differential across the valve. Thus, the dew point may be determined based on engine sensor outputs in addition to, or in place of the weather data.

After determining the dew point, method 600 may continue to 614 which comprises determining if there is condensate formation in a charge air cooler (e.g., CAC 218 described above in FIG. 2). Condensate may occur in the CAC when the CAC is below the dew point. Thus, the controller may determine if there is condensation forming in the CAC based on a temperature of CAC as estimated based on outputs from a temperature sensor positioned near or within the CAC (e.g., air charge temperature sensor 225 described above in FIG. 2). Thus, it may be determined that condensate is forming in the CAC if the temperature of the CAC is below the dew point. In this way, the presence of condensate in the CAC may be determined based on a pressure of charge air in the CAC, an ambient humidity level, an amount of EGR flowing into the CAC, and a temperature of air within the CAC. Further, the presence of condensate in the CAC may additionally be determined based on wind speed relative to the vehicle, and precipitation. Condensate may increase with increasing wind speeds and/or precipitation rates. The dew point may increase for increases in ambient humidity, EGR flow and boost pressure. That is, the temperature at which water vapor turns to liquid may increases for increases in humidity, EGR flow, and boost pressure.

If it is determined at 614 that condensate is forming within the CAC, method 600 may continue from 614 to 616 which comprises reducing EGR flow. In some examples, EGR flow may be reduced by a pre-set amount at 616. However, in other examples, the amount that the EGR flow is reduced at 616 may be determined based on an estimate amount of condensate formation in the CAC. The amount of condensate forming in the CAC may be estimated based on a difference between the temperature of the CAC, and the dew point. Thus, EGR flow may be reduced to a greater extent for greater differences between the CAC temperature and the dew point, when the CAC temperature is below the dew point.

However if it is determined that the CAC temperature is above the dew point at 614, and thus that condensate is not forming within the CAC, then method 600 may continue from 614 to 618 which comprises adjusting EGR flow based on one or more of ambient humidity, ambient temperature, and boost pressure. For example, future CAC temperature and ambient humidity models may be generated based on the received weather data and/or outputs from one or more engine sensors, and EGR flow may be regulated to maintain the CAC temperature below the dew point during future engine operating conditions. Thus a desired EGR flow may be determined based on the CAC temperature and the dew point, where the desired EGR flow may be an EGR flow that maintains the CAC temperature below the dew point to reduce condensate formation. In other examples, the method 600 at 618, may comprise maintaining EGR flow.

Method 600 then continues from either 616 or 618 to 620 which comprises determining a dilution rate based on the ambient humidity and EGR flow rate. For example, the dilution rate may increase for increases in the ambient humidity and EGR flow rates. The dilution rate may be a fuel dilution rate, or a rate at which fuel is diluted in the engine.

After determining the dilution rate at 620, method 600 may then continue to 622 which comprises adjusting a spark timing and/or a fuel injection timing based on the dilution rate. For example, the spark timing and/or fuel injection timing may be advanced with decreasing dilution rates, and may be retarded for increasing dilution rates. Method 600 then returns.

Turning to FIG. 7, it shows an example method 700 for adjusting grille shutter operation. Specifically, an active grille shutter system (e.g., grille shutter system 260 described above in FIG. 2) comprising adjustable grille shutters (e.g., grille shutters 244 described above in FIG. 2) may become stuck and/or may operate with reduced functionality when degraded or when clogged with debris (e.g., rock dirt, ice, snow, etc.). Method 700 provides an example approach for determining whether the grille shutter system is degraded, or has simply become clogged with dirt, mud, etc., when movement of the grille shutters is restricted and/or the grille shutters are stuck. Further, method 700 may include displaying an alert to the vehicle operator to wash off the grille shutters if it is determined that the grille shutters are clogged with debris (e.g., mud, snow, ice, dirt, etc.).

Method 700 begins at 702 which comprises determining if one or more grille shutters (e.g., grille shutters 244 described above in FIG. 2) are stuck. It may be determined that the grille shutters are stuck based on control signals sent from the controller to an actuator of the grille shutters. Thus, if the position of the grille shutters do not change when commanded to do so by the engine controller, then it may be determined that the grille shutters are stuck. If it is determined at 702 that the grille shutters are not stuck, then method 700 may continue from 702 to 704 which comprises continuing to adjust the grille shutters based on engine operating conditions. Method 700 then returns.

However, if the grille shutters are determined to be stuck at 702, then method 700 may continue from 702 to 706 which comprises determining if precipitation has occurred based on the received weather data. In some examples, the method 700 at 706 may comprise determining if precipitation has occurred within a recent threshold amount of time and/or if a threshold amount of precipitation occurred. If precipitation has not occurred, then method 700 may continue from 706 to 708 which comprises displaying a notification to a user of the vehicle that the grille shutter may be degraded and/or that it may require maintenance. For example, the notification of grille shutter degradation may be presented to a vehicle operator via a display screen (e.g., visual display 38 described above in FIG. 1). Method 700 then returns.

However, if it is determined that precipitation has occurred, then method 700 may continue from 706 to 710 which comprises determining if the vehicle is on a dirt road. It may be determined whether or not the vehicle is on a dirt road based on the navigation system and/or a web map service as explained in greater detail above with reference to FIG. 1. If the vehicle is not on a dirt road, then method 700 may continue from 710 to 708 and display the notification to the user of the vehicle that the grille shutter may be degraded. Method 700 then returns.

However, if it is determined at 710 that the vehicle is on a dirt road, then method 700 may continue from 710 to 712 which comprises alerting a vehicle user to wash off the grille. The alert may be presented to the vehicle user via the display screen. In other examples, the alert may be presented to the vehicle user via audible sounds. Thus, in some examples, a vehicle operator may be alerted to wash off the grille when the grille shutters are stuck, precipitation has recently occurred, and the vehicle is driving on a dirt road.

In other examples, method 700 may continue directly from 706 to 712 if it is determined at 706 that precipitation has occurred, and may not execute 710. Thus, in some examples, a vehicle operator may be alerted to wash off the grille if precipitation has recently occurred and the grille shutters are stuck. In yet further examples, the method 700 may not execute 706 and may proceed directly from 702 to 710 if it is determined at 702 that the grille shutters are stuck. Thus, in some examples, a vehicle operator may be alerted to wash off the grille if the vehicle is driving on a dirt road and the grille shutters are stuck. After alerting the vehicle user to wash off the grille at 712, method 700 then returns.

Moving on to FIG. 8, it shows an example method 800 for adjusting operation of a two-mode air cleaner. Specifically, the example method 800 may be used to adjust the source from which ambient airflow is inducted into an air cleaner (e.g., air cleaner 211 described above in FIG. 2). The air cleaner may be coupled to two or more sources of gasses (e.g., ambient air), and may be operated to adjust how much airflow (e.g., mass flow rate, volumetric flow rate, etc.), it receives from each of the sources. For example, the air cleaner may be operated to receive ram air from an intake passage (e.g., intake passage 242 described above in FIG. 2) as explained above with reference to FIG. 2. Additionally or alternatively, the air cleaner may be operated to receive intake air from a snorkel (e.g., secondary intake passage 243 described above in FIG. 2) that receives ambient airflow from a position vertically above the intake passage in an on-road vehicle. The air cleaner may also be operated to receive gasses from other sources, such as additional snorkels, exhaust gasses from an exhaust passage (e.g., exhaust conduit 235 described above in FIG. 2), etc.

More specifically, the air cleaner may be operated in a protected first mode. In the protected first mode, the air cleaner does not receive ram air from the intake passage. Thus, in the protected first mode the air cleaner may only receive airflow from the snorkel. However, in a ram air second mode, the air cleaner receives air from the intake passage. In some examples, the air cleaner may only receive airflow from the intake passage in the ram air second mode. It should be appreciated that the air cleaner may switch between the two modes and thus may adjust where it receives airflow from, by adjusting the position of a valve (e.g., valve 272 described above in FIG. 2) included in the intake passage, or snorkel, or a junction between the intake passage and snorkel, or within the air cleaner. Thus a controller (e.g., controller 212 described above in FIG. 2) may send electrical signals (e.g., electrical voltage and/or current changes) to an actuator of the valve to adjust an air induction path into the air cleaner. Thus, in the description of method 800 herein, adjusting of operation of the air cleaner may refer to adjusting of the position of a valve, or other actuator that varies the airflow source from which the air cleaner draws in ambient air. By adjusting the position of the valve, the controller may adjust the relative amount of air received by the air cleaner from the intake passage and the secondary intake passage or snorkel.

Method 800 begins at 802 which comprises determining if there is precipitation in ram air received in the intake passage. Precipitation in the ram air may be detected based on one or more of the received weather data, road conditions, and/or outputs from the humidity sensor. For example, it may be determined that there is precipitation in the ram air when one or more of the received weather data indicates that precipitation is occurring, the road on which the vehicle is driving is flooded with water, the vehicle is driving in a high water level area, the intake passage is below the dew point, etc.

If there is precipitation in the ram air received in the intake passage, then method 800 may continue from 802 to 804 which comprises using the protected second duct (e.g., secondary intake passage 243 described above in FIG. 2) as the air inlet air path that provides the intake manifold (e.g., intake manifold 222 described above in FIG. 2) with intake air. Thus, at 804, the air cleaner may be switched to the protected first mode, and as such the air cleaner and intake manifold may not receive airflow from the intake passage. In some examples, the air cleaner may only receive airflow from the protected second duct. Method 800 then returns.

However, if it is determined at 802, that there is substantially no precipitation in the ram air, then method 802 may continue from 802 to 806 which comprises determining if there is dirt in the intake passage. Determining if there is dirt in the intake passage may comprise determining if the vehicle is driving on a dirt road in the same or similar manner to that described above with reference to 710 in method 700 of FIG. 7. Thus, if the vehicle is driving on a dirt road, then it may be determined that dirt is in the intake passage at 806. If there is dirt in the intake passage, then method 800 continues from 806 to 804 and the air cleaner is switched into the protected first mode. Method 800 then returns.

However, if it is determined at 806 that there is substantially no dirt in the intake passage, then method 800 may continue from 806 to 808 which comprises determining if the ambient temperature is less than a threshold. The ambient temperature may be determined based on one or more of the wirelessly received weather data and outputs from the ambient temperature sensor. If it is determined at 808 that the ambient temperature is less than the threshold, then method 800 may continue from 808 to 804 and the air cleaner is switched into the protected first mode. Method 800 then returns.

However, if it is determined at 808 that the ambient temperature is not less than the threshold at 808, then method 800 may continue to 810 which comprises determining if the ambient humidity is greater than a threshold. The ambient humidity may be determined based on one or more of the wirelessly received weather data and outputs from the ambient humidity sensor. If the ambient humidity is greater than the threshold at 810, then method 800 may proceed from 810 to 804 and the air cleaner is switched into the protected first mode. Method 800 then returns.

However, if it is determined at 810 that the ambient humidity is not greater than the threshold, then method 800 may continue from 810 to 812 which comprises determining if the engine load is less than a threshold. The engine load may be determined based on one or more of a driver demanded torque as determined via input from an accelerator pedal, an engine speed, electrical loads, etc. If the engine load is less than the threshold at 812, then method 800 may continue from 812 to 804 and the air cleaner is switched into the protected first mode. Method 800 then returns.

However, if it is determined at 812 that the engine load is not less than the threshold, then method 800 may proceed from 812 to 814 which comprises continuing to use the intake passage to provide ambient airflow to the intake manifold to deliver the desired engine torque. Thus, at 814, the air cleaner is operated in the ram air second mode. Thus, when the engine load is greater than the threshold engine load, and one or more of the humidity is less than a threshold, the ambient temperature is greater than a threshold, and there is substantially no dirt nor precipitation in the intake passage, then the intake passage may be used to provide more airflow to the intake manifold to meet torque demands of the engine. Thus, operation of the air cleaner may be adjusted based on one or more of precipitation rates, road on which the vehicle is traveling, ambient temperature, ambient humidity, and engine load. In some examples, the air cleaner may be switched to the protected first mode when the engine load is less than the threshold and one or more of precipitation is in the ram air, dirt is in the intake passage, ambient temperature is less than the threshold, and humidity is greater than the threshold. Further, the air cleaner may not be switched to the protected first mode when the engine load is greater than the threshold, even when one or more of precipitation is in the ram air, dirt is in the intake passage, ambient temperature is less than the threshold, and humidity is greater than the threshold.

Continuing to FIG. 9, it shows a graph 900 depicting changes in EGR flow and spark timing, during varying engine operating conditions. Specifically, example changes in spark timing are shown at plot 902, and example changes in EGR flow are shown at plot 904. As explained above with reference to FIG. 7, EGR flow may be adjusted based on one or more of estimated condensate in a charge air cooler (e.g., CAC 218 described above in FIG. 2), outlet temperature of the CAC, efficiency of the CAC, etc., where the condensate may be estimated based on humidity, ambient temperature, etc. Plot 906 shows example changes in the estimated condensate levels in the CAC, and plot 908 shows example changes in ambient humidity. Further, plot 912 shows example changes in ambient temperature. The estimated CAC efficiency may be adjusted based on precipitation levels and wind speed. Plot 910 shows example changes in wind speed, and plot 914 shows example changes in precipitation rates.

As explained above with reference to FIG. 2, spark timing may be adjusted to a more advanced or more retarded timing relative to maximum brake torque (MBT) timing. EGR flow may be estimated based on one or more of a position of an EGR valve (e.g., EGR valve 252 described above with reference to FIG. 2) positioned in an EGR passage (e.g., passage 251 described above in FIG. 2), a pressure differential across the valve, a difference in pressure between where the EGR passage is coupled to in an exhaust passage (e.g., exhaust conduit 235 described above with reference to FIG. 2) and an intake passage (e.g., intake passage 242 described above in FIG. 2), etc. The humidity may represent ambient relative humidity, and as explained above with reference to FIG. 3, the humidity may be estimated based on either outputs from a humidity sensor (e.g., humidity sensor 229 described above in FIG. 1) or weather data received wirelessly from a vehicle communication system (e.g., telematics unit 30 described above in FIG. 1), or both. Similarly, the temperature may represent ambient temperature of air outside of the vehicle (e.g., vehicle 202 described above in FIG. 2), and the ambient temperature may be estimated based on either the wirelessly received weather data or outputs from a temperature sensor (e.g., temperature sensor 221 described above in FIG. 1), or both. Wind speed may represent the velocity (e.g., speed and direction) of wind relative to the vehicle if the vehicle were stationary. In other examples, the wind speed may represent the velocity of wind relative to the vehicle as the vehicle is moving. Wind speed may be estimated based on the wirelessly received weather data and/or estimates of current vehicle speed. Precipitation levels may represent a volumetric and/or mass flow rate of precipitation (e.g., rain, snow, hail, etc.) which may be estimated based on the wirelessly received weather data.

Spark timing may be adjusted by a controller (e.g., controller 212) by adjusting an electrical signal (e.g., voltage and/or current), such as a pulse width modulated signal, supplied to one or more spark plugs (e.g., spark plug 272 described above in FIG. 2). Further, EGR flow may be adjusted by adjusting a position of the EGR valve. The position of the EGR valve may be adjusted between a fully closed first position and a fully open second position and/or any position there-between via, for example, electrical signals sent from the controller to an actuator of the EGR valve. In the fully closed position substantially no EGR may flow through the valve to the intake passage, and the amount of EGR flowing to the intake passage may increase as the valve is adjusted with increasing deflection towards the fully open position, where an opening formed by the valve increases with increasing deflection towards the fully open position.

Beginning before $t_1$, humidity levels may be increasing from a lower first level (plot 908), and ambient temperature may be relatively stable at around a higher first level (plot 912). Due to the increasing humidity levels, condensate levels in the CAC may be increasing before $t_1$ (plot 906). Further, precipitation levels may be at a lower first level. In some examples, substantially no precipitation occurs before $t_1$. Further, wind speed (plot 910) may be at a respective lower first level before $t_1$. EGR flow (plot 904) may be at a higher first level before $t_1$. In response to the increasing humidity and condensate levels before $t_1$, spark timing may be advanced from MBT. Specifically, the amount of advance of the spark timing may be proportional to the increase in condensate levels.

At $t_1$, the humidity level may continue to increase, and the condensate levels may increase above a threshold, the threshold represented by plot 905 in FIG. 9. In response to the condensate levels increasing above the threshold at $t_1$, EGR flow may be reduced from the higher first level it was at before $t_1$, to a lower second level, the second level being lower than the first level. Thus, EGR flow is reduced at $t_1$. Spark timing may continue to be advanced relative to MBT. The ambient temperature may continue to fluctuate around the higher first level, wind speed may remain around the lower first level, and precipitation may continue to remain at the lower first level at $t_1$.

Between $t_1$ and $t_2$, the condensate levels may decrease due to the reduced EGR flow. EGR flow may remain around the lower second level between $t_1$ and $t_2$, and the spark timing may be retarded back towards MBT from the more advanced position attained at $t_1$. Humidity levels may remain relatively constant at a higher second level, precipitation may remain at the lower first level, ambient temperature may continue to fluctuate around the higher first level, and wind speed may remain at the lower first level between $t_1$ and $t_2$.

At $t_2$, the wind speed may increase from the lower first level, and as such, condensate levels may begin to increase at $t_2$. Spark timing may return to approximately MBT at $t_2$, and EGR may remain at the lower second level. Humidity levels may remain relatively constant at the higher second level, precipitation may remain at the lower first level, and ambient temperature may continue to fluctuate around the higher first level at $t_2$.

Between $t_2$ and $t_3$, wind speed may continue to increase and as such, condensate levels may continue to increase. Spark timing may remain around MBT between $t_2$ and $t_3$, and EGR may remain at the lower second level. Humidity levels may remain relatively constant at the higher second level, precipitation may remain at the lower first level, and ambient temperature may continue to fluctuate around the higher first level between $t_2$ and $t_3$.

At $t_3$, the wind speed may stop increasing, and may reach a higher second level. However, condensate levels may increase above the threshold at $t_3$, and in response to the condensate levels increasing above the threshold, EGR flow may be reduced from the lower second level to a lower third level, the lower third level being less than the lower second level. Spark timing may remain at MBT at, humidity levels may remain relatively constant at the higher second level, precipitation may remain at the lower first level, and ambient temperature may continue to fluctuate around the higher first level at $t_3$.

Between $t_3$ and $t_4$, wind speed may remain around the higher second level, and condensate levels may decrease below the threshold as a result of the EGR flow being reduced to the lower third level at $t_3$. EGR flow may remain at the lower third level, spark timing may remain around MBT, humidity levels may remain relatively constant at the higher second level, precipitation may remain at the lower first level, and ambient temperature may continue to fluctuate around the higher first level between $t_3$ and $t_4$.

At $t_4$, precipitation may begin to increase from the lower first level, and as such, condensate levels may begin to increase at $t_4$. Spark timing may remain approximately at MBT at $t_4$, and EGR may remain at the lower third level. Humidity levels may remain relatively constant at the higher second level, ambient temperature may remain at the higher first level, and wind speed may remain around the higher second level at $t_4$.

Between $t_4$ and $t_5$ precipitation may continue to increase and may reach a higher second level. As such, condensate levels may continue to increase between $t_4$ and $t_5$. Spark timing may remain at approximately MBT, and EGR may remain at the lower third level between $t_4$ and $t_5$. Humidity levels may remain relatively constant at the higher second level, ambient temperature may remain at the higher first level, and wind speed may remain around the higher second level.

At $t_5$, precipitation rates may remain at the higher second level, and condensate levels may increase above the threshold at $t_5$. In response to the condensate levels increasing above the threshold, EGR flow may be reduced from the lower third level to a lower fourth level, the lower fourth level being less than the lower third level. Spark timing may remain at MBT, humidity levels may remain relatively constant at the higher second level, wind speed may remain at the higher second level, and ambient temperature may continue to fluctuate around the higher first level at $t_5$.

Between $t_5$ and $t_6$, precipitation rates may remain around the higher second level, and condensate levels may decrease below the threshold as a result of the EGR flow being reduced to the lower fourth level at $t_5$. EGR flow may remain at the lower fourth level, spark timing may remain around MBT, humidity levels may remain relatively constant at the higher second level, wind speed may remain around the higher second level, and ambient temperature may continue to fluctuate around the higher first level between $t_5$ and $t_6$.

At $t_6$, precipitation rates and humidity may begin to decrease from their respective higher second levels. As such, condensate levels may continue to decrease at $t_6$. Further, spark timing may remain at MBT, wind speed may remain at the higher second level, EGR flow may remain at the lower fourth level, and ambient temperature may continue to fluctuate around the higher first level at $t_6$.

Between $t_6$ and $t_7$, precipitation rates and humidity may continue to decrease. The precipitation rate may reach the lower first level, and humidity level may decrease to a lower third level, the lower third level being less than the lower first level. As such, condensate levels may continue to decrease between $t_6$ and $t_7$. Further, spark timing may remain at MBT, wind speed may remain at the higher second level, EGR flow may remain at the lower fourth level, and ambient temperature may continue to fluctuate around the higher first level between $t_6$ and $t_7$.

At $t_7$, the wind speed may begin to decrease from the higher second level. The precipitation rate may remain at approximately the lower first level, humidity levels may continue to fluctuate around the lower third level, and condensate levels may continue to decrease at $t_7$. Further, spark timing may remain at MBT, ambient temperature may continue to fluctuate around the higher first level, and EGR flow may remain at the lower fourth level at $t_7$.

Between $t_7$ and $t_8$, the wind speed may continue to decrease and may reach the lower first level. As such, condensate levels may continue to decrease between $t_7$ and $t_8$. The precipitation rate may remain at approximately the lower first level, and humidity levels may continue to fluctuate around the lower third level between $t_7$ and $t_8$. Further, spark timing may remain at MBT, ambient temperature may continue to fluctuate around the higher first level, and EGR flow may remain at the lower fourth level at between $t_7$ and $t_8$.

At $t_8$, EGR flow may be increased from the lower fourth level in response to the decreasing condensate levels. Condensate levels may reach a lower level at $t_8$. The precipitation rate may remain at approximately the lower first level, and humidity levels may continue to fluctuate around the lower third level at $t_8$. Further, spark timing may remain at MBT, ambient temperature may continue to fluctuate around the higher first level, and wind speed may continue to fluctuate around the lower first level at $t_8$.

Between $t_8$ and $t_9$, EGR flow may continue to be increased and may reach a higher fifth level. In some examples the higher fifth level may be greater than the lower second level. Condensate levels remain at the lower level, the precipitation rate may remain at approximately the lower first level, and humidity levels may continue to fluctuate around the lower third level between $t_8$ and $t_9$. Further, spark timing may remain at MBT, ambient temperature may continue to fluctuate around the higher first level, and wind speed may continue to fluctuate around the lower first level between $t_8$ and $t_9$.

At $t_9$, ambient temperature may begin to decrease from the higher first level. As such, condensate levels may begin to increase at $t_9$. EGR flow may remain around the higher fifth level at $t_9$. The precipitation rate may remain at approximately the lower first level, and humidity levels may continue to fluctuate around the lower third level at $t_9$. Further, spark timing may remain at MBT, and wind speed may continue to fluctuate around the lower first level at $t_9$.

Between $t_9$ and $t_{10}$, ambient temperature may continue to decrease and may reach a lower second level. Correspondingly, condensate levels may continue to increase between $t_9$ and $t_{10}$, however, they may remain below the threshold. EGR flow may remain around the higher fifth level between $t_9$ and $t_{10}$. In response to the increasing condensate levels, spark timing may be advanced from MBT between $t_9$ and $t_{10}$. The precipitation rate may remain at approximately the lower first level, humidity levels may continue to fluctuate around the lower third level between, and wind speed may continue to fluctuate around the lower first level between $t_9$ and $t_{10}$.

At $t_{10}$, EGR flow may begin to be reduced from the higher fifth level in response to the increasing condensate levels. Thus, in some examples, EGR flow may be reduced in response to increasing condensate levels, even when the condensate levels are still below the threshold represented by plot 905. Spark timing may be retarded back towards MBT at $t_{10}$, in response to the reduction in EGR flow at $t_{10}$. Condensate levels may begin to decrease at $t_{10}$. Ambient temperature may remain around the lower second level, the precipitation rate may remain at approximately the lower first level, humidity levels may continue to fluctuate around the lower third level between, and wind speed may continue to fluctuate around the lower first level at $t_{10}$.

After $t_{10}$, EGR flow may reach a lower sixth level, the lower sixth level being less than the higher fifth level. Condensate levels may decrease to lower levels similar to levels between $t_6$ and $t_7$, and spark timing may remain around MBT. Ambient temperature may remain around the lower second level, the precipitation rate may remain at approximately the lower first level, humidity levels may continue to fluctuate around the lower third level, and wind speed may continue to fluctuate around the lower first level after $t_{10}$.

In this way, a technical effect of increasing fuel efficiency and reducing regulated emissions is achieved by obtaining more accurate estimates of one or more of weather parameters, and current engine operating conditions. More accurate estimates of the one or more of weather parameters, and current engine operating conditions may be achieved by utilizing both wirelessly received weather information, and outputs from various vehicle and/or engine sensors. More specifically, by assessing the accuracy of both the wirelessly received weather data, and the various engine and/or vehicle sensors, an engine controller may decide whether to use the weather data, or outputs from one or more sensors included in the vehicle, or a combination of both, to estimate one or more of a weather parameter, ambient condition, and/or a current engine operating condition. Estimates of one or more of the weather parameter, ambient conditions, and/or current engine operating condition may be adjusted based on the accuracies of the weather data and engine sensors' outputs. As such, a more accurate estimate of one or more of weather parameters, ambient conditions, and current engine operating conditions may be achieved than in vehicle systems in which one or more of a weather parameter, ambient condition, and/or current engine operating condition are only estimated based on either weather data, or vehicle sensors' outputs.

For example, when the engine sensors' outputs are more accurate than the weather data, such as when the vehicle is not in wireless communication with the remote servers and has not received a weather update for more than a duration, and/or the vehicle is more than a threshold distance from the nearest weather measurement, and/or the vehicle has entered a microclimate, the weather parameters may be estimated based on the engine sensors. In other examples, when the engine sensors' outputs are more accurate than the weather data, more accurate estimates of the weather parameters may be achieved by weighting the estimates of the weather parameters towards the measurements provided by the engine sensors.

Conversely, when the weather data are more accurate than the engine sensors, such as when the engine compartment is above a higher first threshold or below a lower second threshold, and/or the humidity is above a threshold, and/or EGR flow is above a threshold, and/or wind speed is above a threshold, the weather parameters may be estimated based on the weather data. In other examples, when the weather data are more accurate than the engine sensors, more accurate estimates of the weather parameters may be achieved by weighting the estimates of the weather parameters towards the measurements provided by the weather data.

Engine operating parameters such as spark timing, fuel injection timing, EGR flow, and air inlet induction path are feedback controlled, meaning the engine operating parameters are adjusted based on the estimates of one or more weather parameters, ambient conditions, and/or current engine operating conditions. Thus, the fuel efficiency and emissions levels of the vehicle may depend on the accuracy of the estimates of the one or more weather parameters, ambient conditions, and/or current engine operating conditions. Since, more accurate estimates of one or more of the weather parameters, ambient conditions, and/or current engine operating conditions are achieved in at least one representation of the present invention, fuel efficiency and regulated emissions may be reduced.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-3, I-4, I-6, V-12, opposed 4, and other engine configurations. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle method, comprising:
receiving a first measurement of a weather parameter from one or more vehicle sensors and a second measurement of the weather parameter from remote weather data measured at a distance away from the vehicle;
generating an estimate of the weather parameter based on relative accuracies of the first and second measurements with respect to one another and further based on the distance and whether the vehicle is determined to be in a microclimate condition; and
adjusting at least one engine operating parameter based on the generated estimate.

2. The method of claim 1, wherein the estimate is based on a severity of the microclimate.

3. The method of claim 2, wherein the severity indicates a degree of difference between the microclimate and a surrounding climate of the vehicle.

4. The method of claim 2, wherein the estimate is further based on a duration since a last update of the remote weather data.

5. The method of claim 1, wherein the estimate is based on a look-up table that includes a relationship between weather data accuracies and distance from the vehicle to the remote weather measurement.

6. The method of claim 5, wherein the remote weather data is a closest remote weather measurement to the vehicle.

7. The method of claim 1, wherein the microclimate includes a car wash.

8. The method of claim 1, wherein the microclimate includes a covered area.

9. The method of claim 1, wherein the engine operating parameter includes EGR flow.

10. The method of claim 1, wherein the at least one engine parameter comprises one or more of a fuel injection amount, fuel injection timing, spark timing, air cleaner operation, and air induction pathway.

11. A method, comprising:
in a first mode where wireless communication with a weather service provider is not established, adjusting at least one engine operating parameter based on outputs from one or more vehicle sensors;
in a second mode where wireless communication with a weather service provider is established and the vehicle is not determined to be entering a microclimate, adjusting the at least one engine operating parameter based on wirelessly received weather data; and
in a third mode where wireless communication with a weather service provider is established and the vehicle is determined to be entering the microclimate, adjusting the at least one engine operating parameter based on the wirelessly received weather data and outputs from the one or more vehicle sensors.

12. The method of claim 11, wherein the one or more vehicle sensors comprise an ambient temperature sensor.

13. The method of claim 11, wherein the one or more vehicle sensors comprise an air charge temperature sensor.

14. The method of claim 11, wherein the one or more vehicle sensors comprise an ambient pressure sensor.

15. The method of claim 11, wherein the one or more vehicle sensors comprise an air charge pressure sensor.

16. The method of claim 11, wherein the one or more vehicle sensors comprise an intake oxygen sensor.

17. The method of claim 11, wherein the one or more vehicle sensors comprise a humidity sensor.

18. The method of claim 11, wherein the weather data includes a plurality of measurements of one or more weather parameters, where the weather parameters comprise an ambient humidity.

19. The method of claim 11, wherein the weather data includes a plurality of measurements of one or more weather parameters, where the weather parameters comprise an ambient temperature or pressure.

20. The method of claim 11, wherein the weather data includes a plurality of measurements of one or more weather parameters, where the weather parameters comprise a precipitation type, a precipitation amount, and/or a probability of precipitation.

* * * * *